United States Patent
Aihara et al.

(10) Patent No.: US 12,422,315 B2
(45) Date of Patent: Sep. 23, 2025

(54) LOAD SENSOR

(71) Applicant: Panasonic Intellectual Property Management Co., Ltd., Osaka (JP)

(72) Inventors: Yui Aihara, Osaka (JP); Susumu Uragami, Osaka (JP); Yuta Moriura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 302 days.

(21) Appl. No.: 18/233,638

(22) Filed: Aug. 14, 2023

(65) Prior Publication Data

US 2023/0384174 A1  Nov. 30, 2023

Related U.S. Application Data

(63) Continuation of application No. PCT/JP2022/003600, filed on Jan. 31, 2022.

(30) Foreign Application Priority Data

Feb. 17, 2021 (JP) .................................. 2021-023571

(51) Int. Cl.
  *G01L 1/14* (2006.01)
(52) U.S. Cl.
  CPC .............. *G01L 1/142* (2013.01); *G01L 1/14* (2013.01)
(58) Field of Classification Search
  CPC . G01L 1/14; G01L 1/142; G01L 1/144; G01L 1/146; G01L 1/148
  See application file for complete search history.

(56) References Cited

U.S. PATENT DOCUMENTS

| | | | | |
|---|---|---|---|---|
| 4,986,136 A | * | 1/1991 | Brunner | G01L 1/146 361/278 |
| 2012/0017703 A1 | * | 1/2012 | Ikebe | G06F 3/0202 73/862.626 |
| 2013/0047747 A1 | * | 2/2013 | Joung | G06F 3/04142 73/862.68 |
| 2013/0234734 A1 | * | 9/2013 | Iida | G01L 1/146 324/661 |
| 2015/0276531 A1 | | 10/2015 | Matsuhiro et al. | |

(Continued)

FOREIGN PATENT DOCUMENTS

| | | | | |
|---|---|---|---|---|
| EP | 2899521 A1 | * | 7/2015 | ............. G01L 1/146 |
| JP | 2005003531 A | * | 1/2005 | |
| JP | 2005233877 A | * | 9/2005 | ............. G01L 1/142 |

(Continued)

OTHER PUBLICATIONS

International Search Report issued in corresponding International Patent Application No. PCT/JP2022/003600, dated Mar. 22, 2022, with English translation.

*Primary Examiner* — Herbert K Roberts
(74) *Attorney, Agent, or Firm* — Rimon P.C.

(57) ABSTRACT

A load sensor includes: an electrode; a dielectric body disposed on a surface of the electrode; and an electrically-conductive elastic body having electrical conductivity and disposed so as to be opposed to the dielectric body. A plurality of projections are formed on a surface on the dielectric body side of the electrically-conductive elastic body, and the thickness of the dielectric body decreases in the plane direction from an initial contact position with respect to the electrically-conductive elastic body.

12 Claims, 13 Drawing Sheets

(56) References Cited

U.S. PATENT DOCUMENTS

2016/0178460 A1* 6/2016 Ogura .................... G01L 1/142
                                                      73/862.626
2019/0277713 A1* 9/2019 Moriura .................. G01L 1/14

FOREIGN PATENT DOCUMENTS

| JP | 4429478 B2 | 3/2010 | | |
|---|---|---|---|---|
| JP | 2015-187561 A | 10/2015 | | |
| WO | 2018/096901 A1 | 5/2018 | | |
| WO | WO-2018144772 A1 * | 8/2018 | ............... | G01L 1/14 |

* cited by examiner

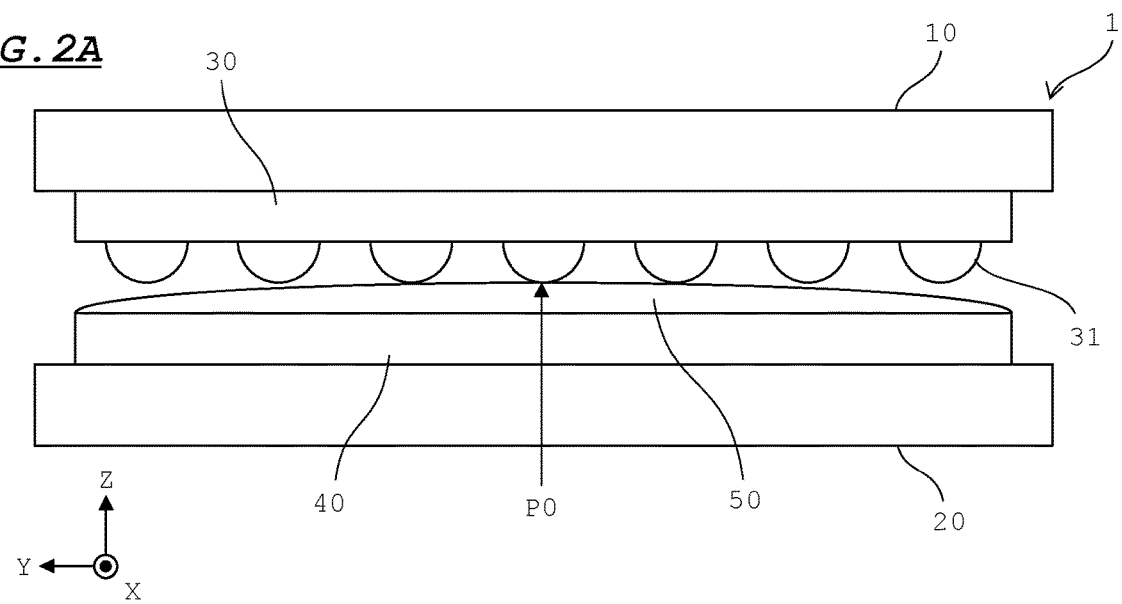
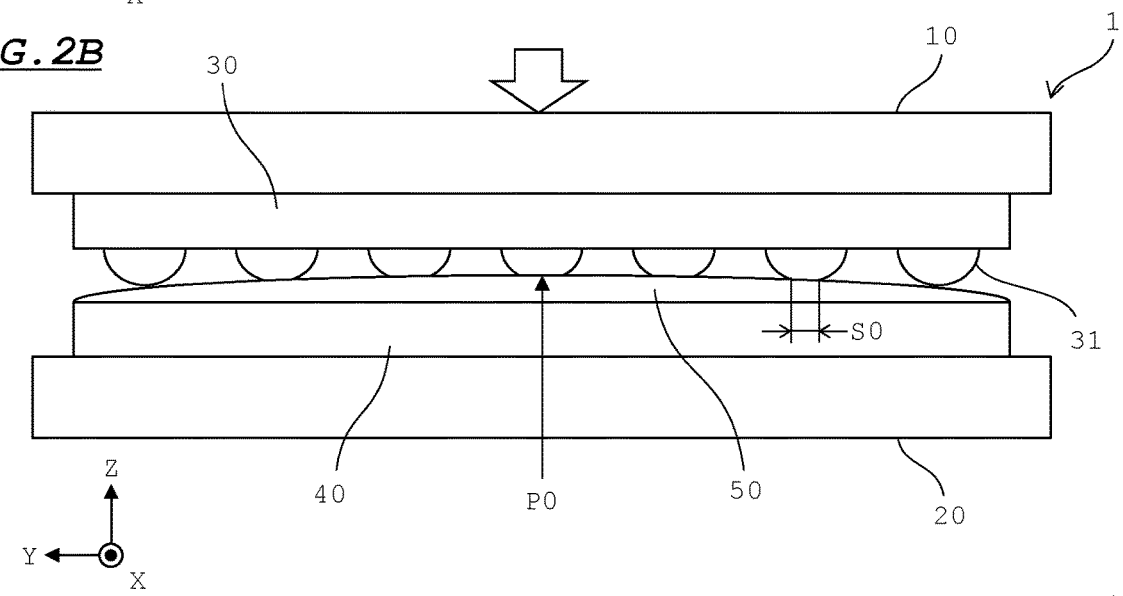
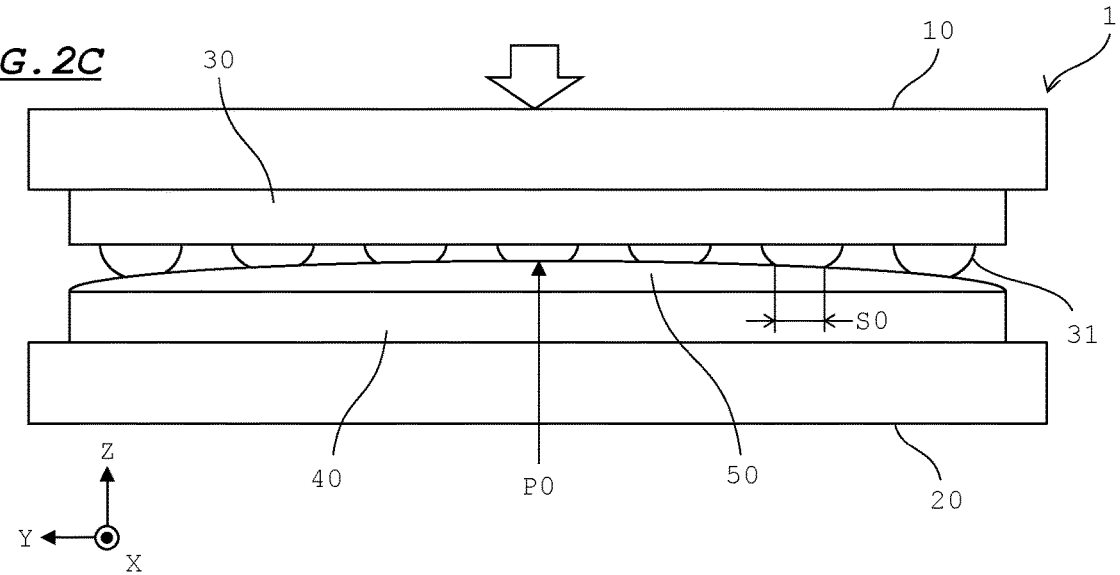

MODIFICATION 1

MODIFICATION 2

MODIFICATION 3

MODIFICATION 4

MODIFICATION 5

LOAD SENSOR

CROSS REFERENCE TO RELATED APPLICATION

This application is a continuation of International Application No. PCT/JP2022/003600 filed on Jan. 31, 2022, entitled "LOAD SENSOR", which claims priority under 35 U.S.C. Section 119 of Japanese Patent Application No. 2021-023571 filed on Feb. 17, 2021, entitled "LOAD SENSOR". The disclosures of the above applications are incorporated herein by reference.

BACKGROUND OF THE INVENTION

Field of the Invention

The present invention relates to a load sensor that detects a load applied from the outside, on the basis of a change in capacitance.

Description of Related Art

To date, as a human machine interface (HMI), a capacitive load sensor has been used for various devices such as keyboards and game controllers. For example, Japanese Patent No. 4429478 describes a force detection device that includes a main substrate, an electrode, an insulating layer, a displacement generator, and an elastic electrically-conductive layer. In this device, the electrode is formed on the upper face of the main substrate and is covered with the insulating layer. The displacement generator includes a fixed part, a flexible part, and an action part, and the action part is connected to the fixed part, which is fixed to the main substrate, via the flexible part. The elastic electrically-conductive layer is formed on the bottom face of the action part, and a rough surface composed of a large number of uneven structures is formed on the lower face of the elastic electrically-conductive layer. When the action part is pressed against the main substrate, the contact state between the upper face of the insulating layer and the rough surface of the elastic electrically-conductive layer changes, so that the capacitance based on the electrode and the elastic electrically-conductive layer changes. By electrically detecting the magnitude of the capacitance, the applied force (load) is detected.

In the capacitive load sensor, it is preferable that the capacitance changes linearly according to the load. That is, when the capacitance changes linearly according to the load, processing for calculating the load from the magnitude of the capacitance becomes very simple. Therefore, in the capacitive load sensor, it is preferable that the range where the capacitance changes linearly according to the load can be ensured to be as wide as possible. However, in the configuration of Japanese Patent No. 4429478, the range where the capacitance based on the electrode and the elastic electrically-conductive layer changes linearly according to the load is narrow. Therefore, with this configuration, it is difficult to detect a load through simple processing in a wide dynamic range.

SUMMARY OF THE INVENTION

A load sensor according to a main aspect of the present invention includes: an electrode; a dielectric body disposed on a surface of the electrode; and an electrically-conductive elastic body having electrical conductivity and disposed so as to be opposed to the dielectric body. A plurality of projections are formed on a surface on the dielectric body side of the electrically-conductive elastic body, and a thickness of the dielectric body decreases in a plane direction from an initial contact position with respect to the electrically-conductive elastic body.

In the load sensor according to the present aspect, in an initial state where no load is applied, only some projections included in the initial contact position are in contact with the dielectric body. Then, when a load is applied, projections come into contact with the dielectric body in order from the initial contact position in association with increase in the load, and the number of the projections in contact with the dielectric body increases. After having come into contact with the dielectric body, the projections are compressed according to increase in the load. Accordingly, the contact area between each projection and the dielectric body increases in association with increase in the load.

Thus, due to the fact that the number of the projections coming into contact with the dielectric body and the contact area between each projection and the dielectric body change in association with the load, the capacitance between the electrode and the electrically-conductive elastic body changes in association with the load. At this time, since the thickness of the dielectric body decreases in the plane direction from the initial contact position, change in the capacitance due to the thickness of the dielectric body becomes large in association with increase in the load. Accordingly, the range where the relationship between the load and the capacitance becomes linear can be widened to a higher load range. Therefore, with the load sensor according to the present aspect, the range where the capacitance changes linearly according to the load can be widened.

The effects and the significance of the present invention will be further clarified by the description of the embodiment below. However, the embodiment below is merely an example for implementing the present invention. The present invention is not limited by the description of the embodiment below in any way.

BRIEF DESCRIPTION OF THE DRAWINGS

FIG. 2A is a side view schematically showing a state of the load sensor in an initial state according to the embodiment;

FIGS. 2B, 2C are each a side view schematically showing a state of the load sensor at load application, according to the embodiment;

It should be noted that the drawings are solely for description and do not limit the scope of the present invention by any degree.

DETAILED DESCRIPTION

The present invention can be applied to an input part for performing an input corresponding to a load applied thereto. Specifically, the present invention can be applied to an input part of an electronic device such as a PC keyboard, an input part of a game controller, a surface layer part for a robot hand to detect an object, an input part for inputting a sound volume, an air volume, a light amount, a temperature, and the like, an input part of a wearable device such as a smartwatch, an input part of a hearable device such as a wireless earphone, an input part of a touch panel, an input part for adjusting an ink amount and the like in an electronic pen, an input part for adjusting a light amount, a color, and the like in a penlight, an input part for adjusting a light amount and the like in a garment that emits light, an input part for adjusting a sound volume and the like in a musical instrument, etc.

The following embodiment is a load sensor that is typically provided in the above devices. Such a load sensor is referred to as a "capacitance-type pressure-sensitive sensor element", a "capacitive pressure detection sensor element", a "pressure-sensitive switch element", or the like. The following embodiment is one embodiment of the present invention, and the present invention is not limited to the following embodiment in any way.

Hereinafter, an embodiment of the present invention will be described with reference to the drawings. For convenience, in each drawing, X, Y, and Z axes that are orthogonal to each other are additionally shown. The Z-axis direction is the height direction of a load sensor 1.

Figure 1:
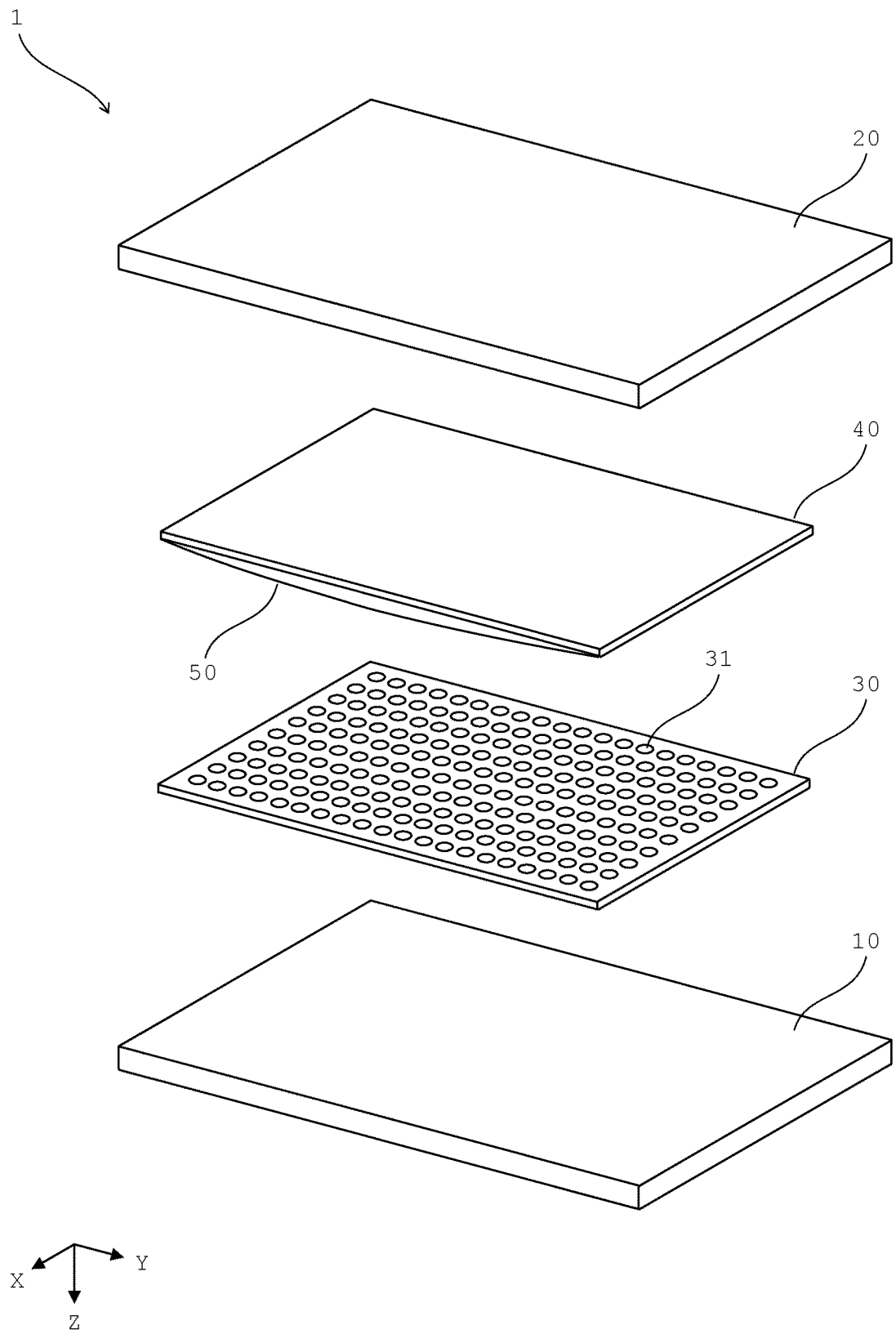
FIG. 1 is an exploded perspective view schematically showing a configuration of a load sensor according to an embodiment.

FIG. 1 is an exploded perspective view schematically showing a configuration of the load sensor 1.

The load sensor 1 includes substrates 10, 20, an electrically-conductive elastic body 30, an electrode 40 and a dielectric body 50.

The substrates 10, 20 are each a rectangular parallelepiped-shaped plate having flexibility and a predetermined thickness. The substrate 10 is a support member for installing the electrically-conductive elastic body 30, the electrode 40, and the dielectric body 50. The substrates 10, 20 are each, for example, a resin material of at least one type selected from polyethylene terephthalate, polycarbonate, polyimide, and the like. The upper and lower faces of the substrates 10, 20 are parallel to the X-Y plane. The shapes and the sizes of the substrates 10, 20 in a plan view are the same with each other.

The electrically-conductive elastic body 30 is an elastic member having electrical conductivity, and has a rectangular shape in a plan view. The electrically-conductive elastic body 30 is composed of a resin material and an electrically-conductive filler dispersed therein, or a rubber material and an electrically-conductive filler dispersed therein. In a case where a resin material is used for the electrically-conductive elastic body 30, the resin material is, for example, a styrene-based resin, a silicone-based resin (polydimethylpolysiloxane (PDMS), or the like), an acrylic-based resin, a rotaxane-based resin, a urethane-based resin, or the like.

In a case where a rubber material is used for the electrically-conductive elastic body 30, the rubber material is, for example, a rubber material of at least one type selected from silicone rubber, isoprene rubber, butadiene rubber, styrene-butadiene rubber, chloroprene rubber, nitrile rubber, polyisobutylene, ethylene propylene rubber, chlorosulfonated polyethylene, acrylic rubber, fluorine rubber, epichlorohydrin rubber, and urethane rubber. The electrically-conductive filler used for the electrically-conductive elastic body 30 is, for example, a material of at least one type selected from Au (gold), Ag (silver), Cu (copper), C (carbon), ZnO (zinc oxide), $In_2O_3$ (indium (III) oxide), and $SnO_2$ (tin (IV) oxide).

On a surface (the face on the Z-axis negative side) of the electrically-conductive elastic body 30, a plurality of projections 31 projecting in the Z-axis negative direction are formed so as to be arranged in a grid pattern. That is, on the surface of the electrically-conductive elastic body 30, a plurality of projections 31 are formed in a row so as to be arranged in the Y-axis direction, and further, a plurality of the rows are disposed in the X-axis direction. In the present embodiment, the interval between the projections 31 in the Y-axis direction is constant, and the interval between the projections 31 in the X-axis direction is also constant. The thickness of the electrically-conductive elastic body 30 is constant except for the portions of the projections 31.

The cross-sectional areas of the projections 31 become smaller toward the Z-axis negative direction. Here, each projection 31 has a spherical surface shape. The shapes and the sizes of the respective projections 31 are the same with each other. In the example in FIG. 1, a total of 200 projections 31, i.e., 10 vertically and 20 horizontally, are formed on the surface of the electrically-conductive elastic body 30. A conducting wire (not shown) for electrically connecting the electrically-conductive elastic body 30 to a device external to the load sensor 1 is provided to the electrically-conductive elastic body 30.

The electrode 40 is made of a metal material having electrical conductivity. The material for the electrode 40 is selected from, for example, $In_2O_3$, ZnO and/or $SnO_2$, and the like. The electrode 40 is a member having a rectangular plate shape in a plan view. In a plan view, the size of the electrode 40 is slightly smaller than that of the substrates 10, 20. The shapes and the sizes of the electrode 40 and the electrically-conductive elastic body 30 in a plan view are the same with each other.

The dielectric body 50 is formed from a material having an electric insulation property. The material for the dielectric body 50 is selected from, for example, a polypropylene resin, a polyethylene terephthalate resin, a polyimide resin, a polyphenylene sulfide resin, $Al_2O_3$, $Ta_2O_5$, and the like. The dielectric body 50 is formed on the surface of the electrode 40 by insert molding, for example. The dielectric body 50 has a shape of which the thickness changes only in one direction (the Y-axis direction). Specifically, the dielectric body 50 has a cylindrical shape protruding toward the electrically-conductive elastic body 30. The thickness of the dielectric body 50 is largest at the middle position in the Y-axis direction, and gradually becomes smaller toward both ends in the Y-axis direction.

In assembly of the load sensor 1, the electrically-conductive elastic body 30 is set on the upper face of the substrate 10, and further, a structure composed of the dielectric body 50 and the electrode 40 is superposed on the upper face of the electrically-conductive elastic body 30 such that the dielectric body 50 is opposed to the electrically-conductive elastic body 30. Then, the substrate 20 is placed on the electrode 40, and the periphery of the substrate 20 is set to the substrate 10 by a setting member. Then, the load sensor 1 is completed.

FIG. 2A is a side view schematically showing a state of the load sensor 1 in an initial state (a state where no load is applied). Here, for convenience, the number of the projections 31 arranged in the Y-axis direction is seven. FIGS. 2B, 2C are each a side view schematically showing a state of the load sensor 1 when a load is applied.

As shown in FIG. 2A, in the initial state where no load is applied, only some projections 31 included in an initial contact position P0 are in contact with the dielectric body 50. The initial contact position P0 is a position where, in the initial state where no load is applied, a projection 31 and the dielectric body 50 are in contact with each other. Here, the thickness of the dielectric body 50 is largest at the middle position in the Y-axis direction of the dielectric body 50, and the heights of all of the projections 31 are the same with each other. Therefore, only at the middle position in the Y-axis direction of the dielectric body 50, are the projection 31 and the dielectric body 50 in contact with each other. That is, the middle position in the Y-axis direction of the dielectric body 50 serves as the initial contact position P0.

Then, when a load is applied to the upper face of the substrate 10, the projections 31 come into contact with the dielectric body 50 in order from the initial contact position P0 in association with increase in the load as shown in FIGS. 2B, 2C, and the number of the projections 31 in contact with the dielectric body 50 increases. FIG. 2C shows a state where the load has increased when compared with that in FIG. 2B. As shown in FIGS. 2B, 2C, after having come into contact with the dielectric body 50, the projections 31 are compressed according to increase in the load. Accordingly, a contact area S0 between each projection 31 and the dielectric body 50 increases in association with increase in the load.

Thus, due to the fact that the number of the projections 31 coming into contact with the dielectric body 50 and the contact area S0 between each projection 31 and the dielectric body 50 change in association with the load, the capacitance between the electrode 40 and the electrically-conductive elastic body 30 changes in association with the load. This capacitance is proportional to the total contact area between the projections 31 and the dielectric body 50 and is inversely proportional to the thickness of the dielectric body 50.

Here, the thickness of the dielectric body 50 decreases in the plane direction from the initial contact position P0. Therefore, the thickness at a position, of the dielectric body 50, where a projection 31 newly comes into contact therewith in association with increase in the load gradually becomes smaller. Thus, the more the load increases, the larger the increase in the capacitance occurring at the newly-contacted position becomes. That is, change in the capacitance due to the thickness of the dielectric body 50 becomes large in association with increase in the load. Accordingly, the range where the relationship between the load and the capacitance becomes linear can be widened to a higher load range.

<Verification 1>

The inventors verified effects according to the configuration of the above embodiment, through simulation.

Figure 3A:
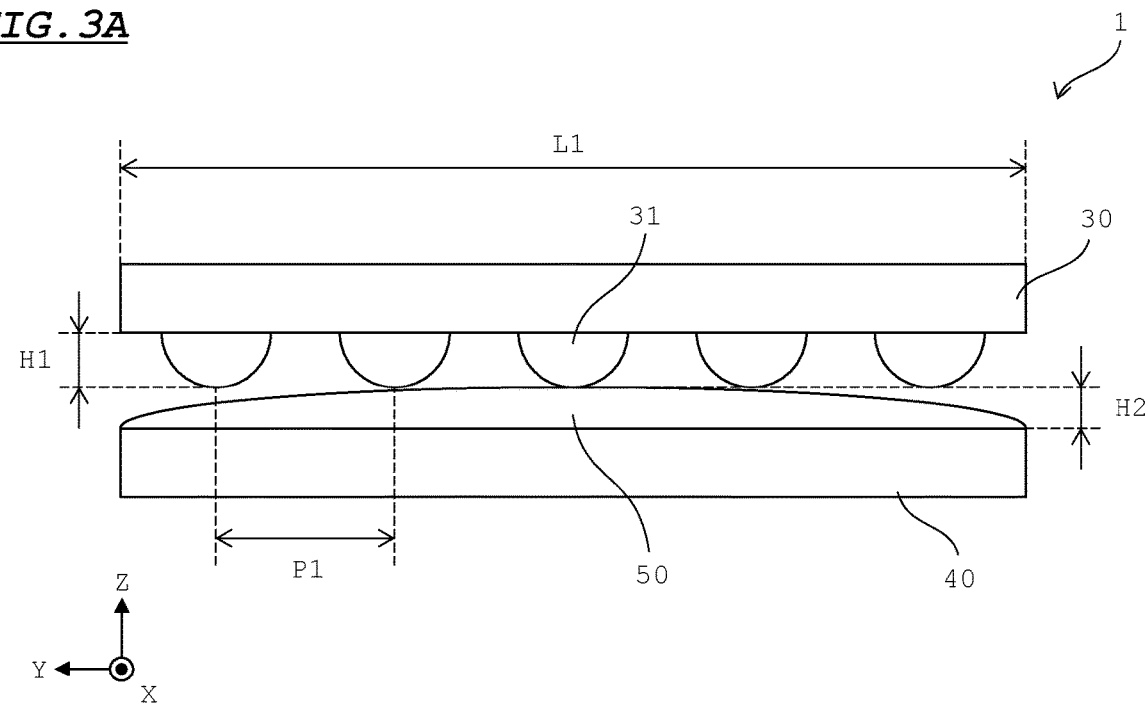
FIG. 3A illustrates a simulation condition according to the embodiment.

FIG. 3A illustrates a simulation condition of Verification 1.

In the present verification, a case where five projections 31 were arranged in one row in the Y-axis direction was assumed. The number of the rows of the projections 31 was set to one. The shape of each projection 31 was set to a hemispherical shape, and a height H1 of the projection 31 was set to 0.06 mm. A pitch P1 of the projections 31 was set to 0.3 mm, and a length L1 in the Y-axis direction of the electrically-conductive elastic body 30 was set to 1.5 mm. The five projections 31 were evenly disposed such that the center of the center projection 31 was positioned at the middle position in the Y-axis direction of the electrically-conductive elastic body 30.

Similar to the length L1 of the electrically-conductive elastic body 30, the length in the Y-axis direction of the electrode 40 was also set to 1.5 mm. The dielectric body 50 was set so as to have a columnar shape having a constant curvature and extend from one end to the other end in the Y-axis direction of the electrode 40. The generatrix of the columnar shape is parallel to the X-axis. The dielectric body 50 was disposed such that the position where the thickness of the dielectric body 50 is largest matches the middle position of the electrode 40 in the Y-axis direction. Therefore, in the Y-axis direction, the middle position of the electrically-conductive elastic body 30 and the middle position of the electrode 40 match each other.

Under this condition, a height H2 (maximum thickness) of the dielectric body 50 was changed, and the relationship between: the load applied between the electrically-conductive elastic body 30 and the electrode 40; and the capacitance between the electrically-conductive elastic body 30 and the electrode 40 was obtained through simulation. In accordance with change in the height H2, the curved shape (curvature) of the surface of the dielectric body 50 was changed such that the dielectric body 50 extends over the entire range of the upper face of the electrode 40. As the height H2 of the dielectric body 50, four heights, i.e., 0 mm, 0.01 mm 0.03 mm, and 0.06 mm, were set. The height H2 of 0 mm corresponds to a case where the surface of the dielectric body 50 is flat.

Figure 3B:
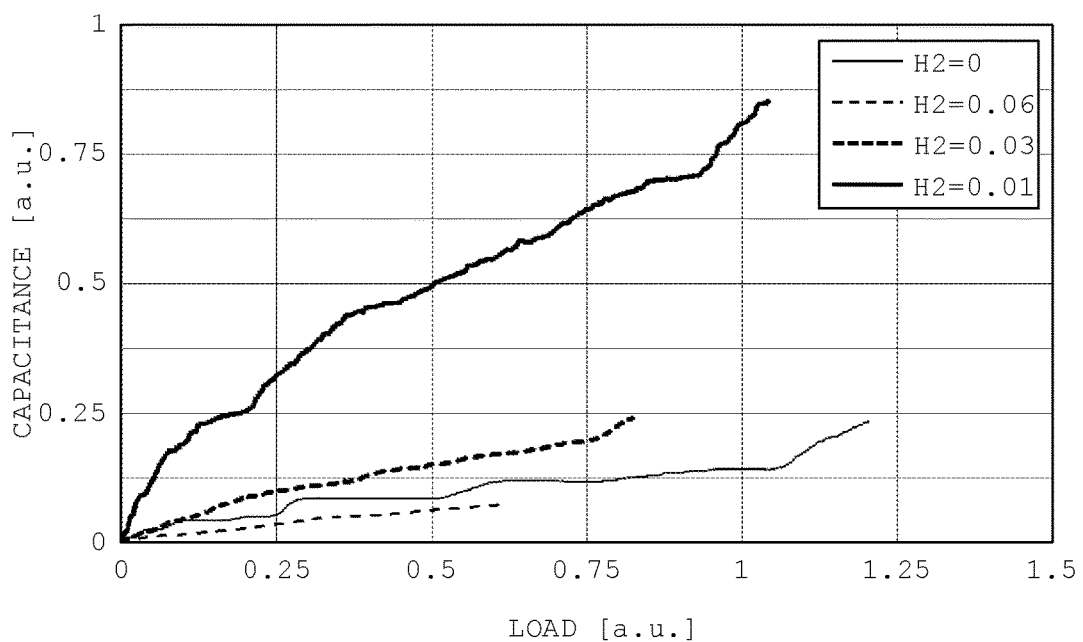
FIG. 3B is a graph showing a simulation result according to the embodiment.

FIG. 3B is a graph showing the simulation result of Verification 1. The vertical axis and the horizontal axis of FIG. 3B are each normalized by a predetermined value.

From the simulation result in FIG. 3B, it was able to be confirmed that, when the height H2 of the dielectric body 50 was set to 0.01 mm, change in the capacitance with respect to the load became significantly linear and highly sensitive when compared with a case where the surface of the dielectric body 50 was flat. In contrast to this, when the height H2 of the dielectric body 50 was set to 0.03 mm, change in the capacitance with respect to the load became linear and highly sensitive when compared with a case where the surface of the dielectric body 50 was flat, but the sensitivity decreased when compared with a case where the height H2 of the dielectric body 50 was 0.01 mm. When the height H2 of the dielectric body 50 was 0.06 mm, change in the capacitance with respect to the load became less sensitive than in a case where the surface of the dielectric body 50 was flat. From these simulation results, it was found that, in terms of the sensitivity and the linearity of change in the capacitance with respect to the load, there is an optimum range for the height H2 of the dielectric body 50, and when the height H2 is too large, the characteristic rather tends to decrease.

<Verification 2>

Next, the inventors verified, through simulation, the range of the height H2 of the dielectric body 50 that can effectively increase the linearity and the sensitivity of change in the capacitance with respect to the load.

Figure 4A:
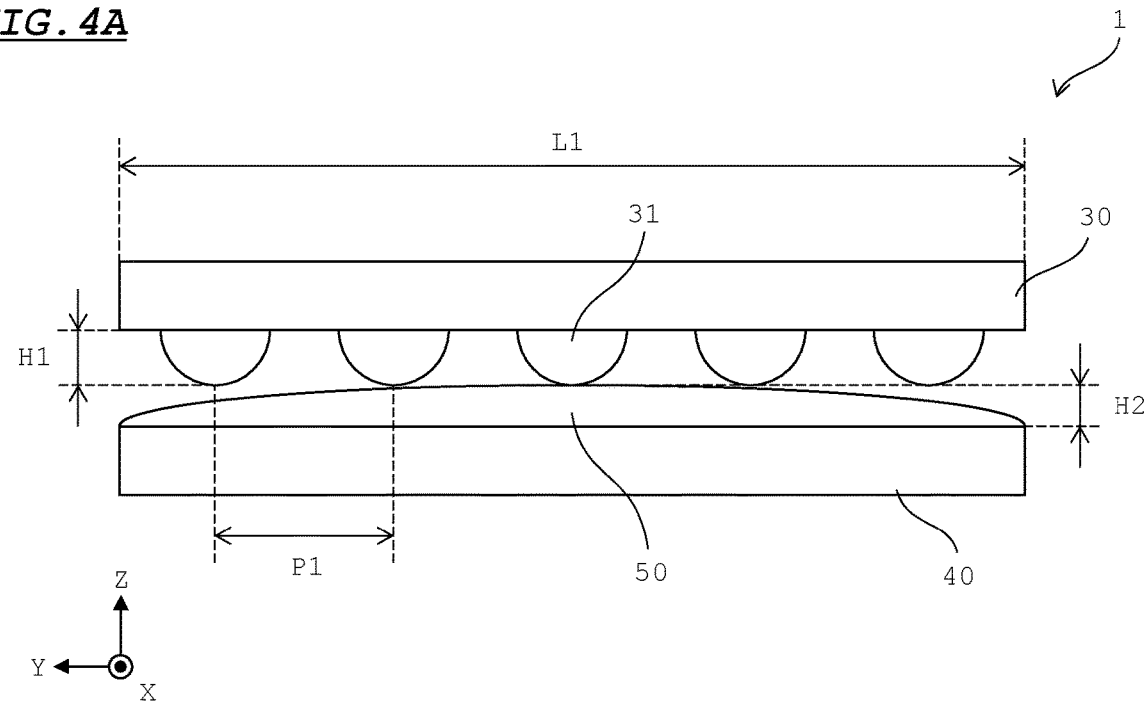
FIG. 4A illustrates a simulation condition according to the embodiment.

FIG. 4A illustrates a simulation condition of Verification 2.

In Verification 2, similar to Verification 1 above, the height H1 and the pitch P1 of the projection 31 were set to 0.06 mm and 0.3 mm, respectively. In addition, similar to Verification 1 above, the length L1 of the electrically-conductive elastic body 30 and the electrode 40 was set to 1.5 mm. The other conditions were also set similar to those in Verification 1 above.

Under this condition, the height H2 (maximum thickness) of the dielectric body 50 was changed, and the relationship between: the load applied between the electrically-conductive elastic body 30 and the electrode 40; and the capacitance between the electrically-conductive elastic body 30 and the electrode 40 was obtained through simulation. Similar to Verification 1 above, in accordance with change in the height H2, the curved shape (curvature) of the surface of the dielectric body 50 was changed such that the dielectric body 50 extends over the entire range of the upper face of the electrode 40. As the height H2 of the dielectric body 50, 0.09 mm was set in addition to 0.01 mm, 0.03 mm, and 0.06 mm in Verification 1 above.

Figure 4B:
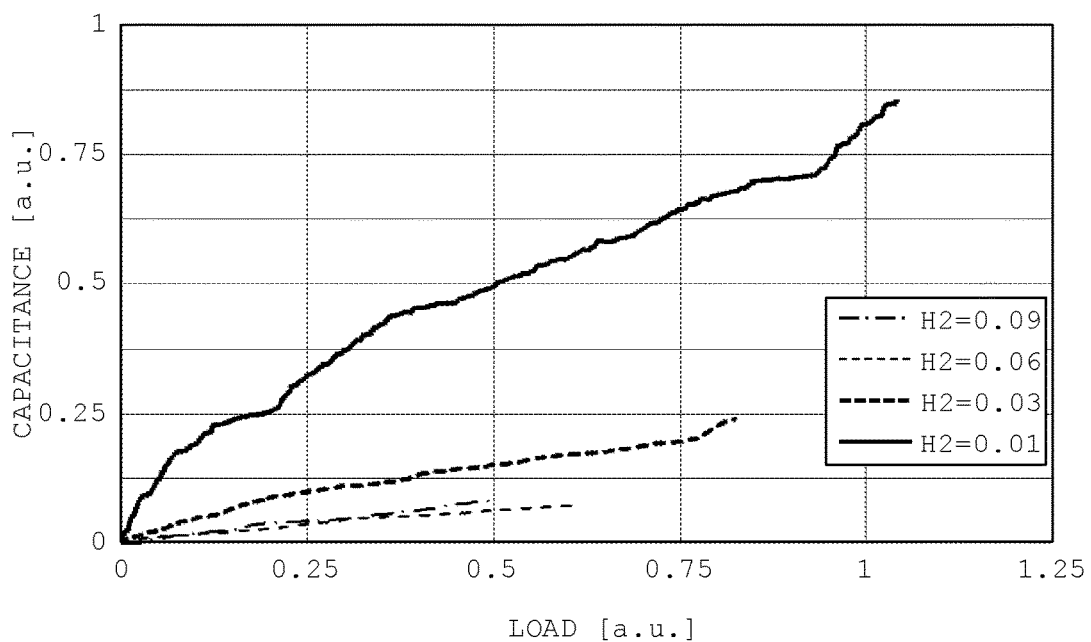
FIG. 4B is a graph showing a simulation result according to the embodiment.

FIG. 4B is a graph showing a simulation result of Verification 2. The vertical axis and the horizontal axis of FIG. 4B are each normalized by a predetermined value.

In the simulation result in FIG. 4B, the characteristic when the height H2 of the dielectric body 50 was 0.09 mm scarcely changed from that when the height H2 of the dielectric body 50 was 0.06 mm. With reference to the verification result in FIG. 3B in combination, it is understood that, when the height H2 of the dielectric body 50 was 0.06 mm or 0.09 mm, the characteristic decreased when compared with a case where the surface of the dielectric body 50 was flat. From this, it was found that, when the height H2 of the dielectric body 50 is 0.06 mm, which is the same as the height H1 of the projection 31, or more, change in the capacitance with respect to the load cannot be improved, relative to a case where the surface of the dielectric body 50 is flat.

Thus, in order to effectively increase the linearity and the sensitivity of change in the capacitance with respect to the load, it is necessary at least to set the height H2 (the maximum change amount of the thickness) of the dielectric body 50 so as to be smaller than the height H1 (projection amount) of the projection 31. From the simulation result in FIG. 4B, it is understood that, more preferably, the height H2 (the maximum change amount of the thickness) of the dielectric body 50 is not greater than half of the height H1 (projection amount) of the projection 31.

Effects of Embodiment

According to the present embodiment, the following effects are exhibited.

As shown in FIG. 2A, in the initial state where no load is applied, only some projections 31 included in the initial contact position P0 are in contact with the dielectric body 50. Then, when a load is applied, the projections 31 come into contact with the dielectric body 50 in order from the initial contact position P0 in association with increase in the load, and the number of the projections 31 in contact with the dielectric body 50 increases. Further, as shown in FIGS. 2B, 2C, after having come into contact with the dielectric body 50, the projections 31 are compressed according to increase in the load. Accordingly, the contact area S0 between each projection 31 and the dielectric body 50 increases in association with increase in the load.

Thus, due to the fact that the number of the projections 31 coming into contact with the dielectric body 50 and the contact area S0 between each projection 31 and the dielectric body 50 change in association with the load, the capacitance between the electrode 40 and the electrically-conductive elastic body 30 changes in association with the load. At this time, since the thickness of the dielectric body 50 decreases in the plane direction from the initial contact position P0, change in the capacitance due to the thickness of the dielectric body 50 becomes large in association with increase in the load. Accordingly, the range where the relationship between the load and the capacitance becomes linear can be widened to a higher load range. Therefore, the range where the capacitance changes linearly according to the load can be widened.

As shown in FIG. 1 and FIG. 2A, the dielectric body 50 has a shape protruding toward the electrically-conductive elastic body 30. Accordingly, while the number of the projections 31 coming into contact at the initial contact position P0 is restricted, the number of the projections 31 that begin to come into contact with the dielectric body 50 due to load application thereafter, can be efficiently increased. Therefore, change in the capacitance at the start of load application can be smoothly raised.

As shown in FIG. 1 and FIG. 2A, the surface on the electrically-conductive elastic body 30 side of the dielectric body 50 has a curved-surface shape. That is, in the present embodiment, the dielectric body 50 has a shape of which the thickness changes only in a one-axis direction. More specifically, the dielectric body 50 has a cylindrical shape. Accordingly, during load application, the contact area S0 between each projection 31 and the dielectric body 50 can be smoothly changed, and the thickness of the dielectric body 50 at the contact position can be smoothly changed. Therefore, the relationship between the load and the capacitance can be more smoothly made close to a linear relationship.

As shown in FIG. 2A, each projection 31 projects in a curved-surface manner. Accordingly, during load application, the contact area S0 between the projection 31 and the dielectric body 50 can be smoothly changed. Therefore, the relationship between the load and the capacitance can be more smoothly made close to a linear relationship.

As shown in the simulation result (Verification 2) in FIG. 4B, the maximum change amount (the height H2) of the thickness of the dielectric body 50 is preferably smaller than the projection amount (the height H1) of the projection 31. Accordingly, change in the capacitance with respect to the load can be improved to be linear and highly sensitive when compared with a case where the surface of the dielectric body 50 is flat.

As shown in FIG. 1 and FIG. 2A, the plurality of projections 31 are disposed so as to be arranged in at least one row, and the thickness of the dielectric body 50 changes in the arrangement direction of the projections 31. As shown in FIG. 3A, the plurality of projections 31 are arranged at a constant interval (the pitch P1). Accordingly, in accordance with load application, the projections 31 can be brought into contact with the dielectric body 50 in order in the arrangement direction, and change in the capacitance with respect to the load can be smoothly made close to being linear.

Modification

The configuration of the load sensor 1 can be modified in various ways other than the configuration shown in the above embodiment.

For example, in the above embodiment, the dielectric body 50 has a cylindrical shape of which the thickness changes only in the Y-axis direction. However, for example, as in Modification 1 shown in FIG. 5A, the dielectric body 50 may have a shape of which the thickness changes not only in the Y-axis direction but also in the X-axis direction. For example, the dielectric body 50 may have a spherical surface shape of which the thickness becomes maximum at the center of the electrode 40.

With this configuration, the position at which the thickness is maximum serves as the initial contact position P0 between the projection 31 and the dielectric body 50 in the initial state where no load is applied, and in accordance with load application, the contact position between the projection 31 and the dielectric body 50 radially expands from the initial contact position P0. With this configuration as well, similar to the above embodiment, change in the capacitance with respect to the load can be improved so as to be linear and highly sensitive, due to change in the number of the projections 31 coming into contact with the dielectric body 50, change in the contact area between the dielectric body 50 and each projection 31, and change in the thickness of the dielectric body 50 at the contact position.

In the above embodiment, only one dielectric body 50 having a cylindrical shape is disposed on the electrode 40, but the configuration of the dielectric body 50 is not limited thereto. For example, the dielectric body 50 may be divided into a plurality, and in each divided region, the thickness of the dielectric body 50 may change in the plane direction. For example, as in Modification 2 shown in FIG. 5B, the dielectric body 50 may be divided into two in the Y-axis direction, and the thickness of the dielectric body 50 in each divided region A1 may change in the Y-axis direction. In the example in FIG. 5B, the shape of the dielectric body 50 in each divided region A1 is set to a cylindrical shape.

With this configuration as well, similar to the above embodiment, in accordance with load application, the number of the projections 31 coming into contact with the dielectric body 50 and the contact area between the dielectric body 50 and each projection 31 change, and the thickness of the dielectric body 50 changes at each contact position. Accordingly, similar to the above embodiment, change in the capacitance with respect to the load can be improved so as to be linear and highly sensitive.

Figure 5A:
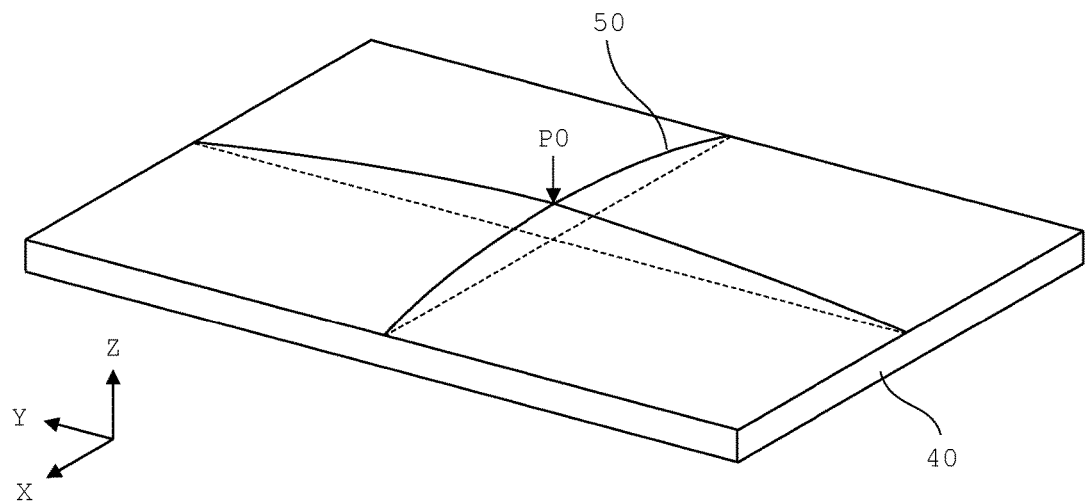
FIG. 5A is a perspective view schematically showing configurations of an electrode and a dielectric body according to Modification 1.
Figure 5B:
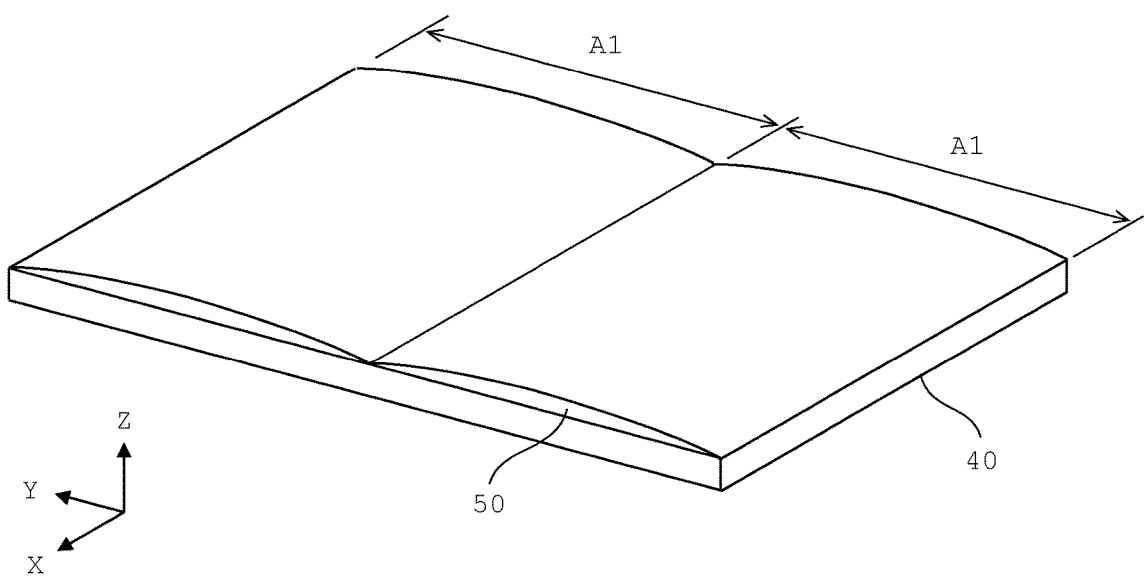
FIG. 5B is a perspective view schematically showing configurations of an electrode and a dielectric body according to Modification 2.

The dividing number of the dielectric body 50 is not limited to two, and the dielectric body 50 may be divided into another number. In this case as well, the thickness of the dielectric body 50 only needs to be set so as to change in the plane direction in each divided region. The dielectric body 50 may be divided not only in the Y-axis direction but also in the X-axis direction. The shape of the dielectric body 50 set for each divided region is not limited to a cylindrical shape. For example, a shape of which the thickness changes in two directions as shown in FIG. 5A may be adopted.

The configuration of the dielectric body 50 is not limited to a configuration in which the thickness at the center in the Y-axis direction is largest.

Figure 8A:
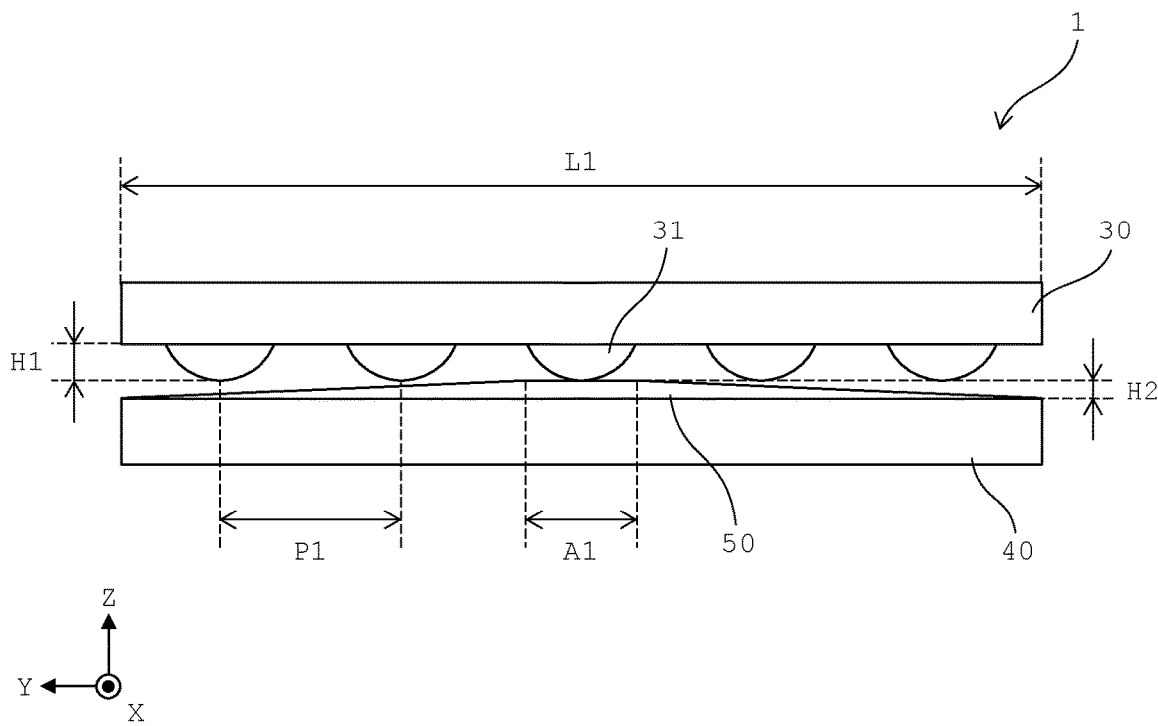
FIG. 8A is a side view schematically showing a configuration of a load sensor according to another modification.

For example, as shown in FIG. 8A, in a range A1 at the center in the Y-axis direction, the upper face of the dielectric body 50 may be a plane (plane perpendicular to the load application direction) parallel to the X-Y plane. That is, the upper face of the dielectric body 50 with which the projection 31 at the center in the Y-axis direction comes into contact may be a plane parallel to the X-Y plane. In this case, the range A1 can be set to have a width that covers, when the center projection 31 is most compressed by a load, the contact area of this projection 31. The range A1 is circular in a plan view, for example. The upper face other than in the range A1 of the dielectric body 50 can be set to have a shape similar to that in the above embodiment.

Figure 8B:
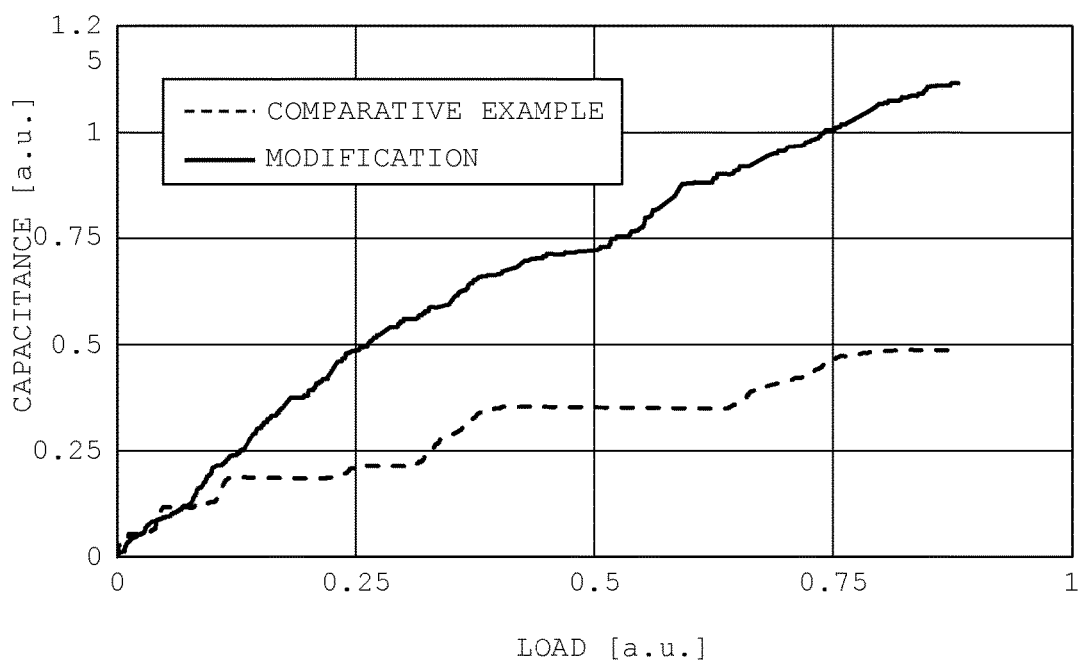
FIG. 8B is a graph showing a simulation result according to the modification in FIG. 8A.

FIG. 8B is a graph showing a verification result of verifying, through simulation, the relationship between the load and the capacitance with respect to the configuration in FIG. 8A.

In this simulation, the height H1, the pitch P1, and the length L1 were set similar to those in Verification 1 in the above embodiment. The height H2 was defined as a height up to the plane in the range A1, based on the upper face of the electrode 40 (the lower face of the dielectric body 50). Here, the height H2 was set to 0.03 mm. Similar to Verification 1 above, a case where five projections 31 were arranged in one row in the Y-axis direction was assumed, and the number of the rows of the projections 31 was set to one. The shape of the projection 31 was set to a hemispherical shape.

Under this condition, with respect to the range of the load until the capacitance was substantially saturated in the configuration in FIG. 8A, the relationship between the load and the capacitance was obtained through simulation. As a comparative example, similar to Verification 1 above, the relationship between the load and the capacitance when the entire range of the upper face of the dielectric body 50 was a plane parallel to the X-Y plane was obtained through simulation.

From the simulation result in FIG. 8B, also when the upper face of the dielectric body 50 was a plane parallel to the X-Y plane in the range A1 at the center in the Y-axis direction, change in the capacitance with respect to the load was able to be confirmed to be significantly linear and highly sensitive, when compared with a case where the entirety of the surface of the dielectric body 50 was flat.

Figure 9A:
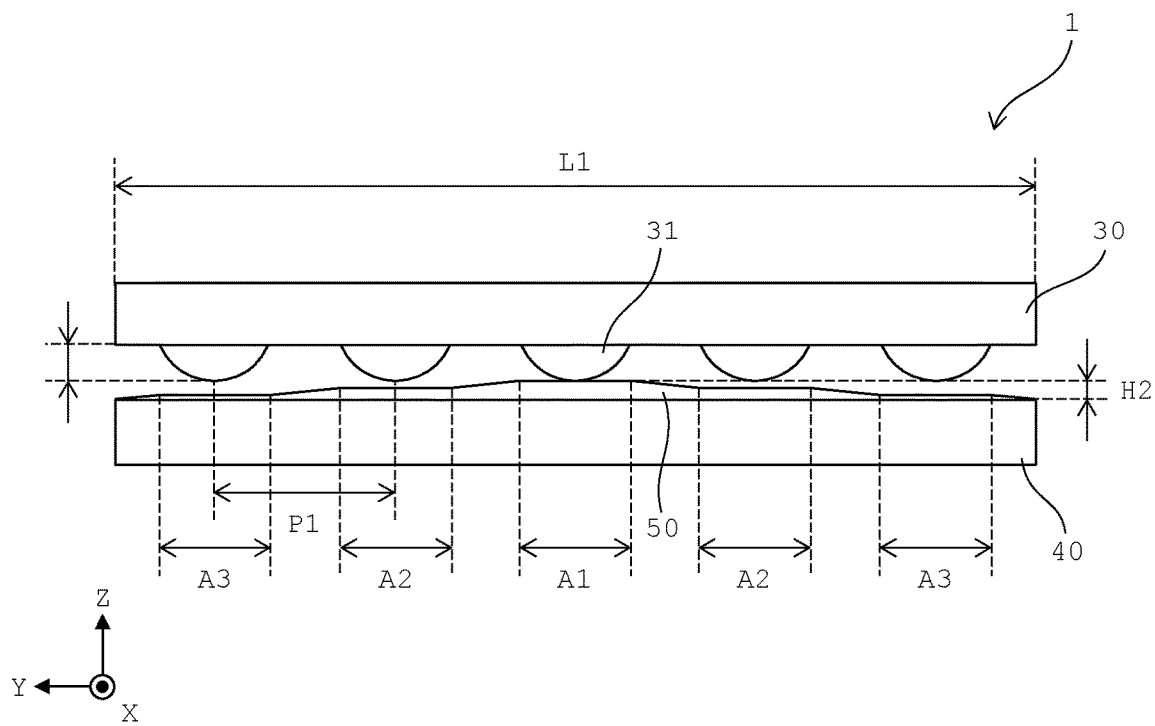
FIG. 9A is a side view schematically showing a configuration of a load sensor according to another modification.

As shown in FIG. 9A, ranges A2, A3, of the upper face of the dielectric body 50, with which the projections 31 other than the projection 31 at the center in the Y-axis direction come into contact may further be planes parallel to the X-Y plane. In this case as well, the ranges A2, A3 can each be set to have a width that covers, when the opposing projection 31 is most compressed by a load, the contact area of this projection 31. The upper face of the dielectric body 50 other than in the ranges A1, A2, A3 can be set to have a shape similar to that in the above embodiment.

Figure 9B:
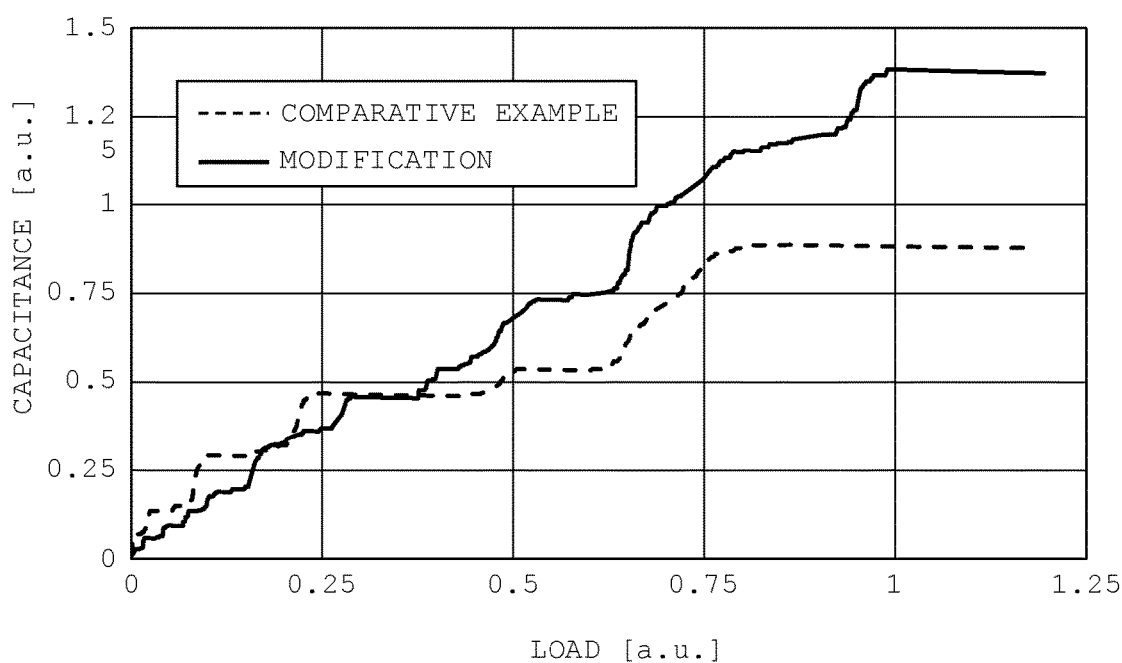
FIG. 9B is a graph showing a simulation result according to the modification in FIG. 9A.

FIG. 9B is a graph showing a verification result of verifying, through simulation, the relationship between the load and the capacitance with respect to the configuration in FIG. 9A.

The simulation conditions other than the height H2 were set similar to those in the case in FIG. 8B. The height H2 was defined as a height up to each plane in the range A1, A2, A3, based on the upper face of the electrode 40 (the lower face of the dielectric body 50). Here, the height H2 up to the plane in the range A1 was set to 0.03 mm, the height H2 up to the plane in the range A2 was set to 0.02 mm, and the height H2 up to the plane in the range A3 was set to 0.01 mm.

Under this condition, with respect to the range of the load until the capacitance was substantially saturated in the configuration in FIG. 9A, the relationship between the load and the capacitance was obtained through simulation. Similar to the above, with respect to the comparative example as well, the relationship between the load and the capacitance was obtained through simulation.

From the simulation result in FIG. 9B, also when the upper face of the dielectric body 50 was a plane parallel to the X-Y plane in the ranges A2, A3 as well as the range A1, change in the capacitance with respect to the load was able to be confirmed to be linear and highly sensitive, when compared with a case where the entirety of the surface of the dielectric body 50 was flat.

Figure 10A:
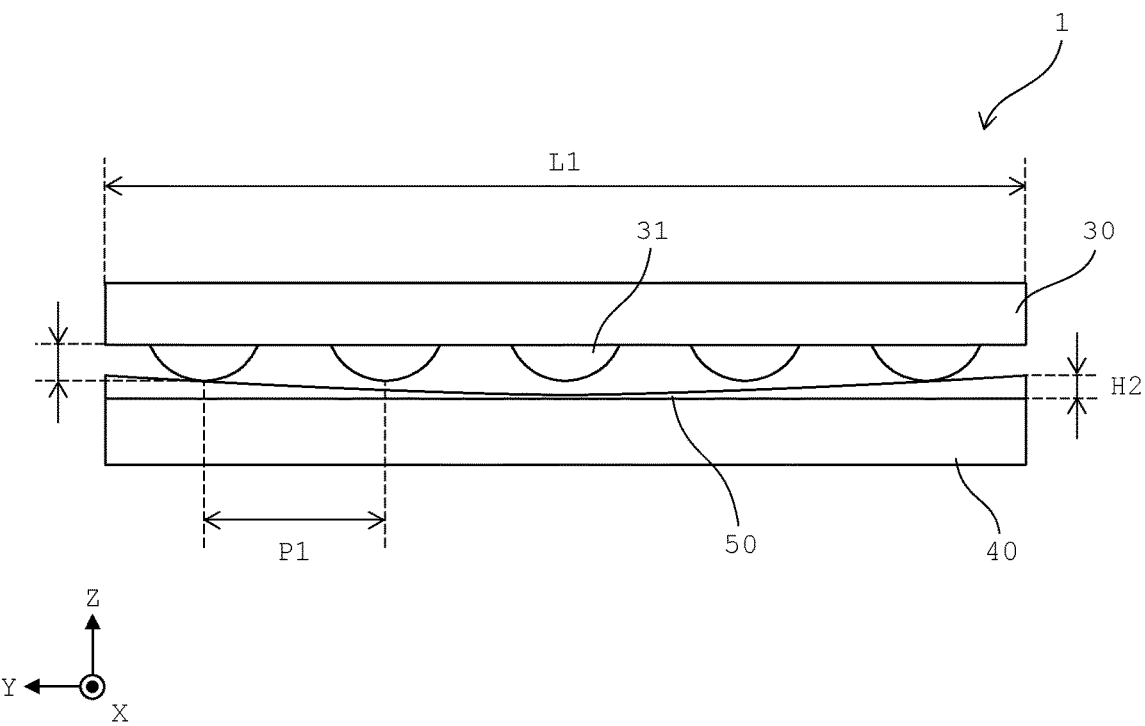
FIG. 10A is a side view schematically showing a configuration of a load sensor according to another modification.

As shown in FIG. 10A, the upper face of the dielectric body 50 may be configured to have a recessed-surface shape of which the thickness at both ends in the Y-axis direction is largest and of which the thickness at the middle position in the Y-axis direction is smallest. In this case, the upper face of the dielectric body 50 can be formed to be a cylindrical surface of which the generatrix is parallel to the X-axis.

Figure 10B:
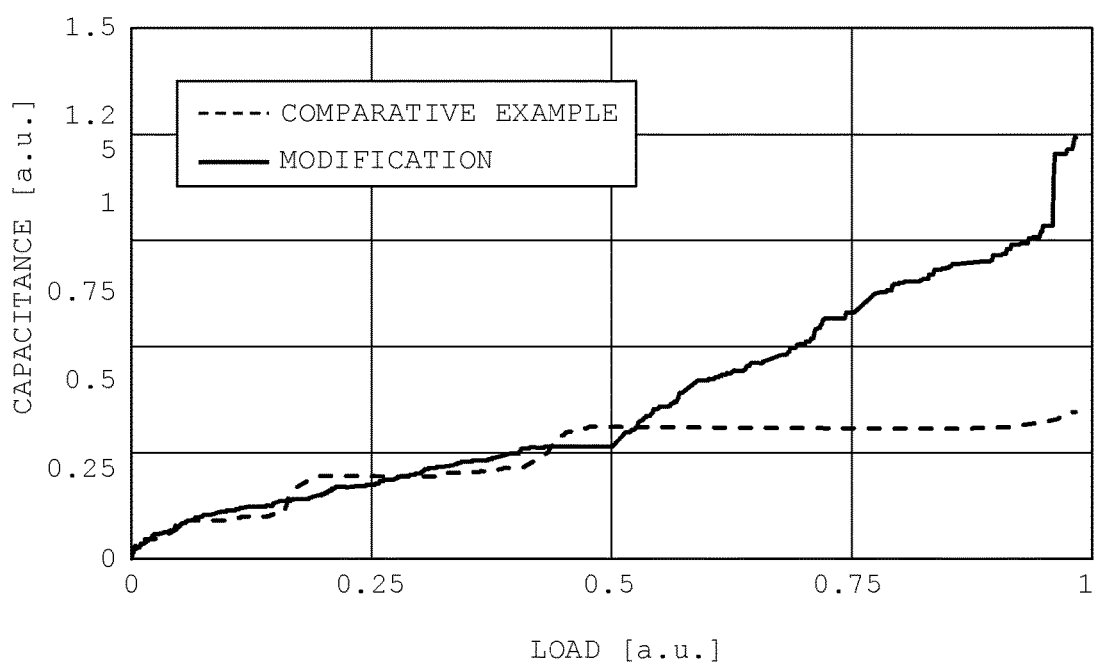
FIG. 10B is a graph showing a simulation result according to the modification in FIG. 10A.

FIG. 10B is a graph showing a verification result of verifying, through simulation, the relationship between the load and the capacitance with respect to the configuration in FIG. 10A.

The simulation conditions other than the height H2 were set similar to those in the case in FIG. 8B. The height H2 was defined based on the upper face of the electrode 40 (the lower face of the dielectric body 50). The height H2 up to the upper face at both ends in the Y-axis direction of the dielectric body 50 was set to 0.03 mm, and the height H2 up to the upper face at the center in the Y-axis direction of the dielectric body 50 was set to 0.0009 mm.

Under this condition, with respect to the range of the load until the capacitance was substantially saturated in the configuration in FIG. 10A, the relationship between the load and the capacitance was obtained through simulation. Similar to the above, with respect to the comparative example as well, the relationship between the load and the capacitance was obtained through simulation. From the simulation result in FIG. 10B, also when the upper face of the dielectric body 50 was formed in a recessed-surface shape of which the thickness at both ends in the Y-axis direction was largest and of which the thickness at the middle position in the Y-axis direction was smallest, change in the capacitance with respect to the load was able to be confirmed to be significantly linear and highly sensitive, when compared with a case where the entirety of the surface of the dielectric body 50 was flat.

Figure 11A:
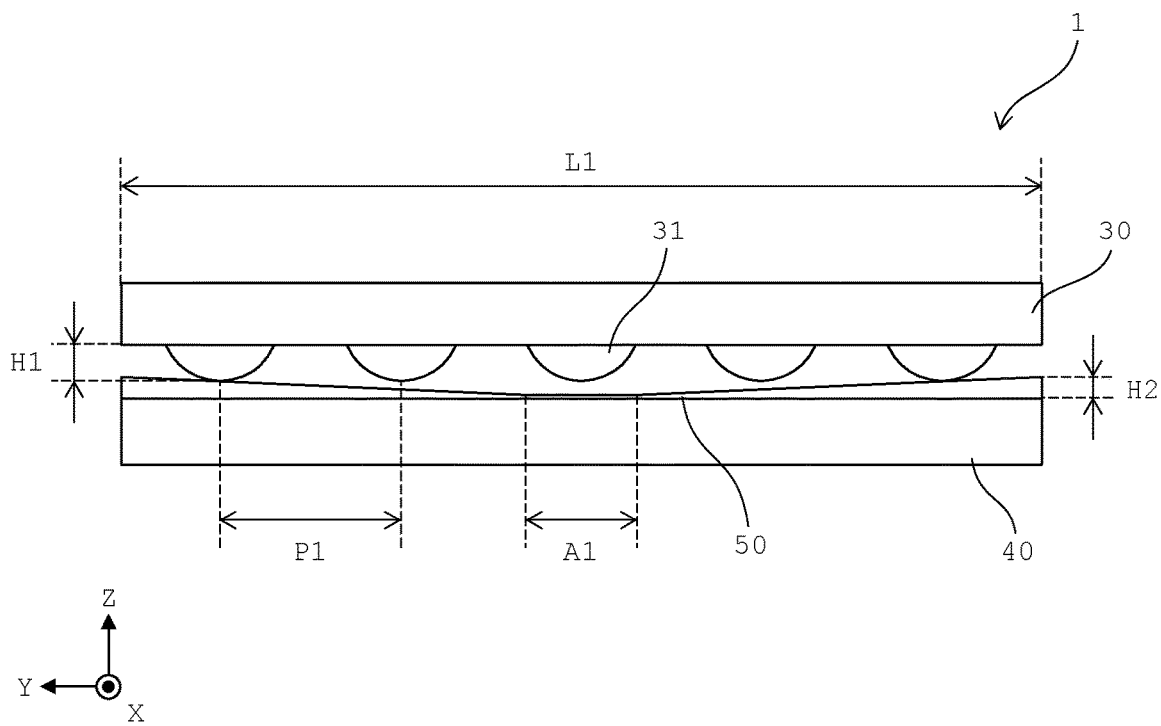
FIG. 11A is a side view schematically showing a configuration of a load sensor according to another modification.

As shown in FIG. 11A, the range A1, of the upper face of the dielectric body 50, with which the projection 31 at the center in the Y-axis direction comes into contact may be a plane parallel to the X-Y plane. In this case as well, the range A1 can be set to have a width that covers, when the opposing projection 31 is most compressed by a load, the contact area of this projection 31. The upper face of the dielectric body 50 other than in the range A1 can be set to have a cylindrical surface similar to that in FIG. 10A.

Figure 11B:
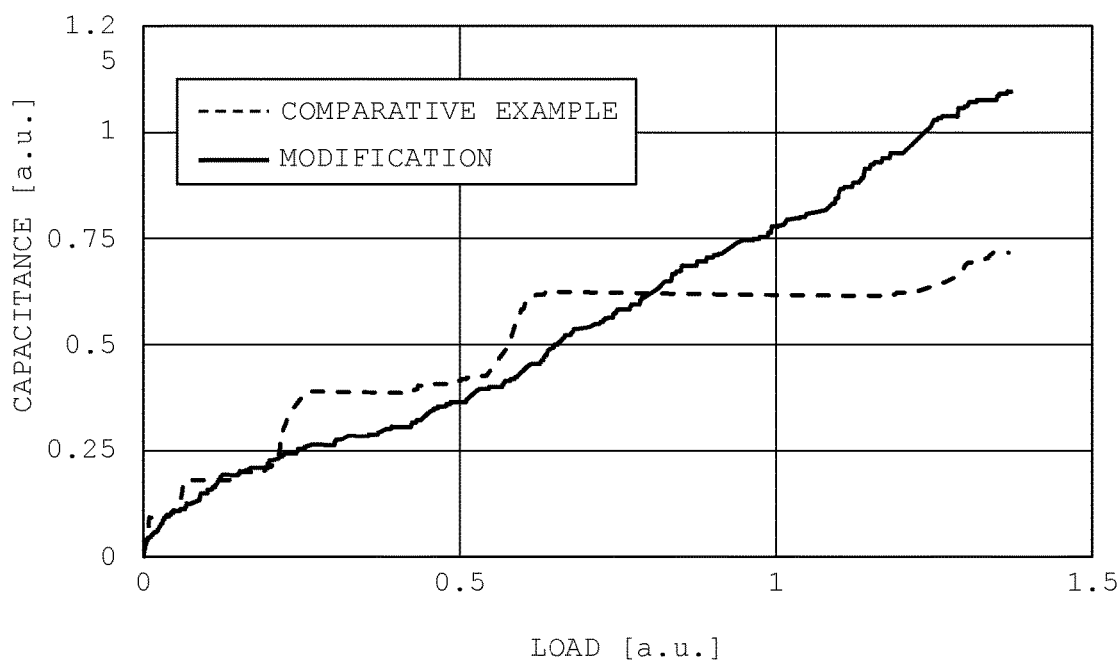
FIG. 11B is a graph showing a simulation result according to the modification in FIG. 11A.

FIG. 11B is a graph showing a verification result of verifying, through simulation, the relationship between the load and the capacitance with respect the configuration in FIG. 11A.

The simulation conditions other than the height H2 were set similar to those in the case in FIG. 8B. The height H2 was defined based on the upper face of the electrode 40 (the lower face of the dielectric body 50). The height H2 up to the upper face at both ends in the Y-axis direction of the dielectric body 50 was set to 0.03 mm, and the height H2 up to the upper face in the range A1 was set to 0.0009 mm.

Under this condition, with respect to the range of the load until the capacitance was substantially saturated in the configuration in FIG. 11A, the relationship between the load and the capacitance was obtained through simulation. Similar to the above, with respect to the comparative example as well, the relationship between the load and the capacitance was obtained through simulation.

From the simulation result in FIG. 11B, also when the upper face of the dielectric body 50 was a plane at the center in the Y-axis direction, change in the capacitance with respect to the load was able to be confirmed to be significantly linear and highly sensitive, when compared with a case where the entirety of the surface of the dielectric body 50 was flat.

Figure 12A:
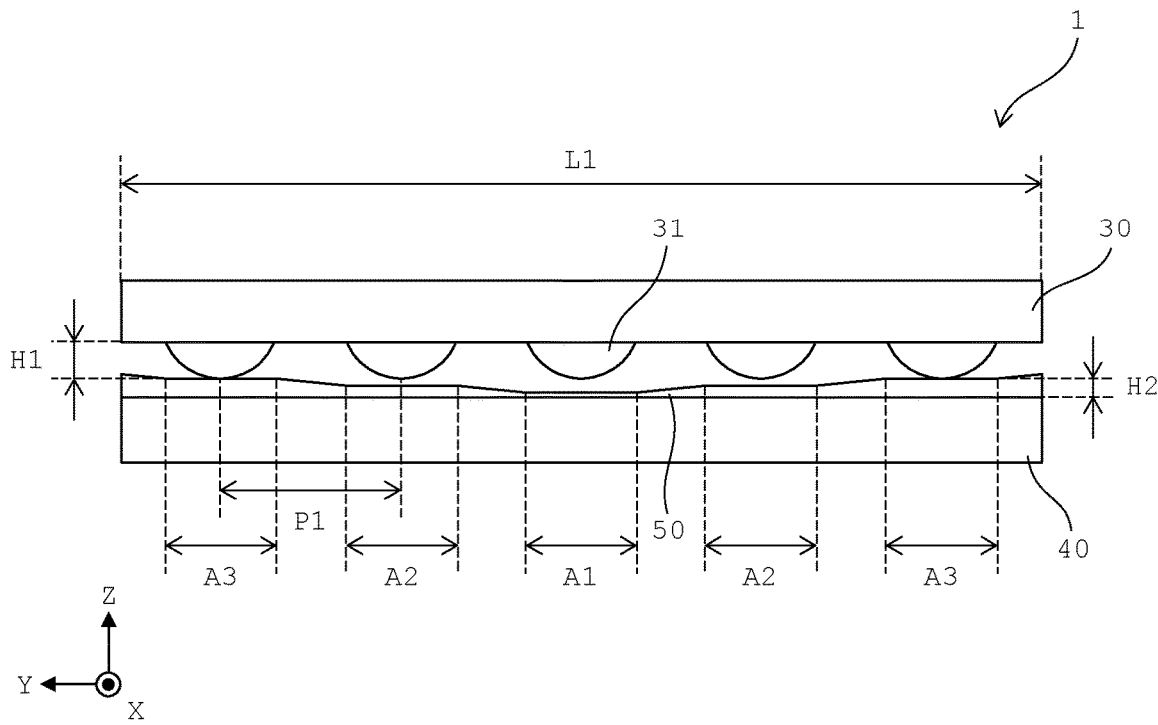
FIG. 12A is a side view schematically showing a configuration of a load sensor according to another modification.

As shown in FIG. 12A, the ranges A2, A3, of the upper face of the dielectric body 50, with which the projections 31 other than the projection 31 at the center in the Y-axis direction come into contact may also be planes parallel to the X-Y plane. In this case as well, the ranges A2, A3 can each be set to have a width that covers, when the opposing projection 31 is most compressed by a load, the contact area of this projection 31. The upper face of the dielectric body 50 other than in the ranges A1, A2, A3 can be set to have a cylindrical surface similar to that in FIG. 10A.

Figure 12B:
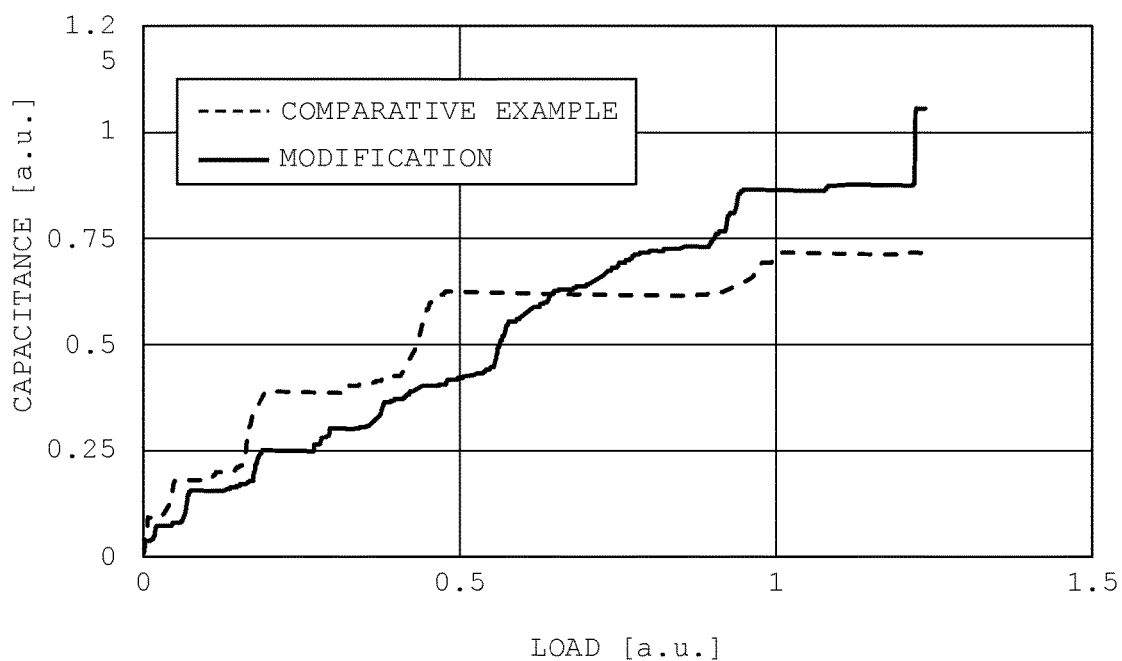
FIG. 12B is a graph showing a simulation result according to the modification in FIG. 12A.

FIG. 12B is a graph showing a verification result of verifying, through simulation, the relationship between the load and the capacitance with respect to the configuration in FIG. 12A.

The simulation conditions other than the height H2 were set similar to those in the case in FIG. 8B. The height H2 was defined as a height up to each plane in the range A1, A2, A3, based on the upper face of the electrode 40 (the lower face of the dielectric body 50). Here, the height H2 up to the plane in the range A1 was set to 0.0009 mm, the height H2 up to the plane in the range A2 was set to 0.01 mm, and the height H2 up to the plane in the range A3 was set to 0.02 mm. A height H3 up to the upper face of the dielectric body 50 at both ends in the Y-axis direction was set to 0.03 mm.

Under this condition, with respect to the range of the load until the capacitance was substantially saturated in the configuration in FIG. 12A, the relationship between the load and the capacitance was obtained through simulation. Similar to the above, with respect to the comparative example as well, the relationship between the load and the capacitance was obtained through simulation.

From the simulation result in FIG. 12B, also when the upper face of the dielectric body 50 was a plane in the ranges A2, A3 as well as the range A1, change in the capacitance with respect to the load was able to be confirmed to be linear and highly sensitive, when compared with a case where the entirety of the surface of the dielectric body 50 was flat.

Figure 13A:
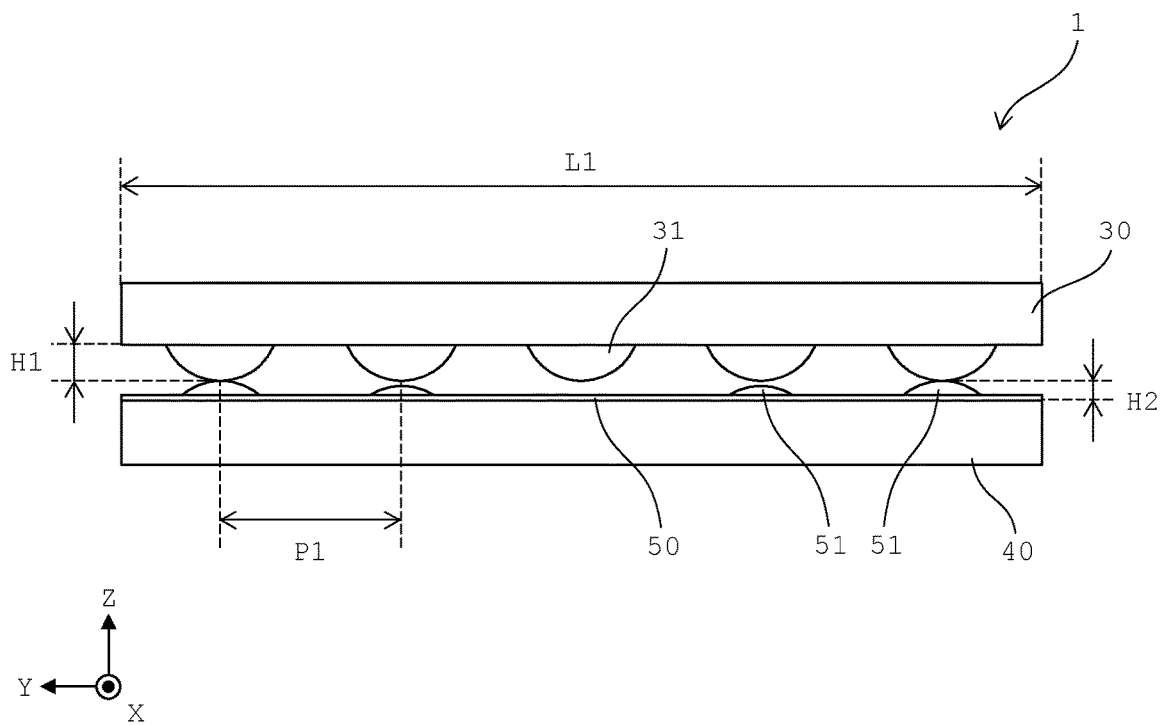
FIG. 13A is a side view schematically showing a configuration of a load sensor according to another modification.

As shown in FIG. 13A, with protrusions 51 being formed on the upper face of the dielectric body 50 opposed to the projections 31, and with the height of each protrusion 51 being changed, the thickness of the dielectric body 50 may decrease in the plane direction from the initial contact position P0 between the dielectric body 50 and the electrically-conductive elastic body 30. Each protrusion 51 has a semi-spherical-like shape for example. In this case, no protrusion 51 may be formed at a position opposed to a predetermined projection 31. In FIG. 13A, no protrusion 51 is formed at the position opposed to the projection 31 at the center in the Y-axis direction.

Figure 13B:
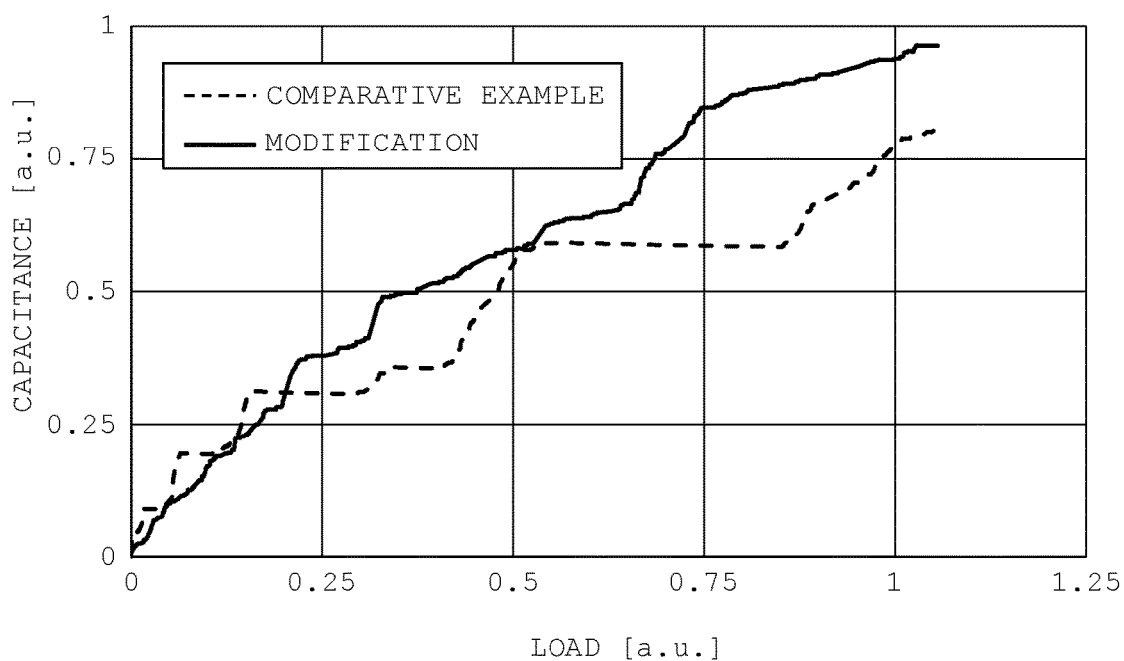
FIG. 13B is a graph showing a simulation result according to the modification in FIG. 13A.

FIG. 13B is a graph showing a verification result of verifying, through simulation, the relationship between the load and the capacitance with respect to the configuration in FIG. 13A.

The simulation conditions other than the height H2 were set similar to those in the case in FIG. 8B. The height H2 was defined based on the upper face of the electrode 40 (the lower face of the dielectric body 50). The height H2 up to the vertex of the protrusion 51 at both ends in the Y-axis direction was set to 0.03 mm, and the height H2 up to the vertex of the protrusion 51 on the inner side thereto was set to 0.02 mm. The height H2 up to the upper face of the dielectric body 50 at the position opposed to the center projection 31 was set to 0.01 mm.

Under this condition, with respect to the range of the load until the capacitance was substantially saturated in the configuration in FIG. 13A, the relationship between the load and the capacitance was obtained through simulation. Similar to the above, with respect to the comparative example as well, the relationship between the load and the capacitance was obtained through simulation.

From the simulation result in FIG. 13B, also when the height of each protrusion 51 was made different, change in the capacitance with respect to the load was able to be confirmed to be linear and highly sensitive, when compared with a case where the entirety of the surface of the dielectric body 50 was flat.

When the simulation result in FIG. 8B and the simulation result in FIG. 9B are compared with each other, the range, i.e., the dynamic range, of the load until the capacitance was saturated was wider in the simulation result in FIG. 8B. The reason for this is considered as follows. That is, when a projection 31 is pressed against a plane parallel to the X-Y plane, the projection 31 is more efficiently deformed in the Z-axis direction. From this, in order to ensure a wider dynamic range, it is preferable that the upper face of the dielectric body 50 at a position opposed to a projection 31 is not a plane perpendicular to the load application direction.

When the simulation result in FIG. 8B and the simulation result in FIG. 10B are compared with each other, the range, i.e., the dynamic range, of the load until the capacitance was saturated was significantly wider in the simulation result in FIG. 8B. The reason for this was found to be as follows. That is, in the structure in FIG. 10A, due to increase in the load, the upper face of the dielectric body 50 at both ends in the Y-axis direction come into contact with the lower face other than the projections 31 of the electrically-conductive elastic body 30. From this, in order to ensure a wider dynamic range, it is preferable that the upper face of the dielectric body 50 has a shape of which the center in the Y-axis direction is high and of which both ends in the Y-axis direction are low.

In the modifications shown in FIG. 8A to FIG. 13B, five projections 31 are arranged in a row in the Y-axis direction. However, similar to the above embodiment, a plurality of the rows may further be disposed in the X-axis direction, and in association therewith, the electrode 40 and the dielectric body 50 may be widened in the X-axis direction. The configurations of Modifications 1 to 4 above may be applied to the modifications shown in FIG. 8A to FIG. 13B.

Other than this, the dielectric body 50 may be configured such that the thickness at one end in the Y-axis direction is largest and the thickness gradually becomes smaller toward the other end in the Y-axis direction.

The surface of the dielectric body 50 is not limited to a curved surface, and may be a plane inclined at a predetermined angle with respect to a plane on the dielectric body 50 side of the electrode 40.

Figure 6A:
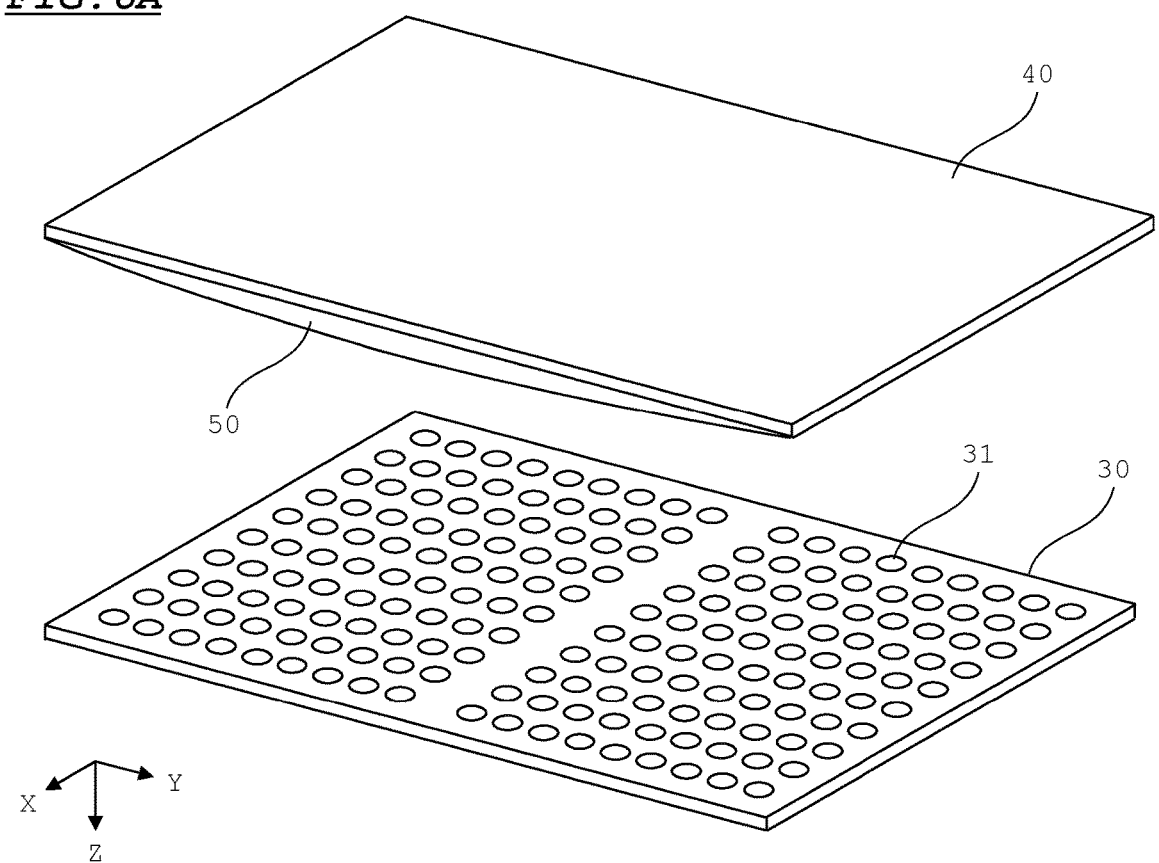
FIG. 6A is a perspective view schematically showing configurations of an electrode, a dielectric body, and an electrically-conductive elastic body according to Modification 3.
Figure 6B:
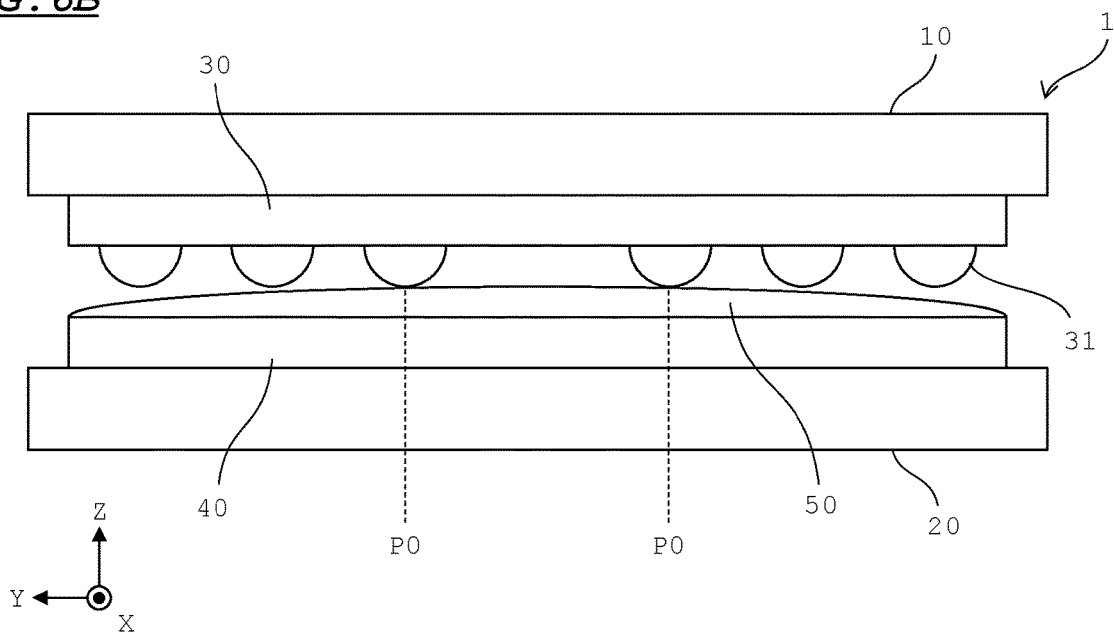
FIG. 6B is a side view schematically showing a state of a load sensor in an initial state, according to Modification 3.

In the above embodiment, the plurality of projections 31 are disposed on the surface of the electrically-conductive elastic body 30 so as to be arranged at a constant interval in the X-axis direction and the Y-axis direction, but the arrangement method of the plurality of projections 31 is not limited thereto. For example, as in Modification 3 shown in FIGS. 6A, 6B, from a form in which a plurality of projections 31 are arranged at a constant interval in the X-axis direction and the Y-axis direction, a row of the projections 31 at the center in the Y-axis direction may be omitted. In this case, as shown in FIG. 6B, the positions of the rows on both sides of the omitted row serve as the initial contact position PG.

With this configuration as well, similar to the above embodiment, change in the capacitance with respect to the load can be improved so as to be linear and highly sensitive. Since change in the contact area between each projection 31 and the dielectric body 50 before and after the start of load application is suppressed when compared with that in the above embodiment, rising of the capacitance immediately after the start of load application can be suppressed from becoming significantly sharp. Accordingly, the state of rising of the capacitance immediately after the start of load application can be made close to a state of being more linear.

Figure 7A:
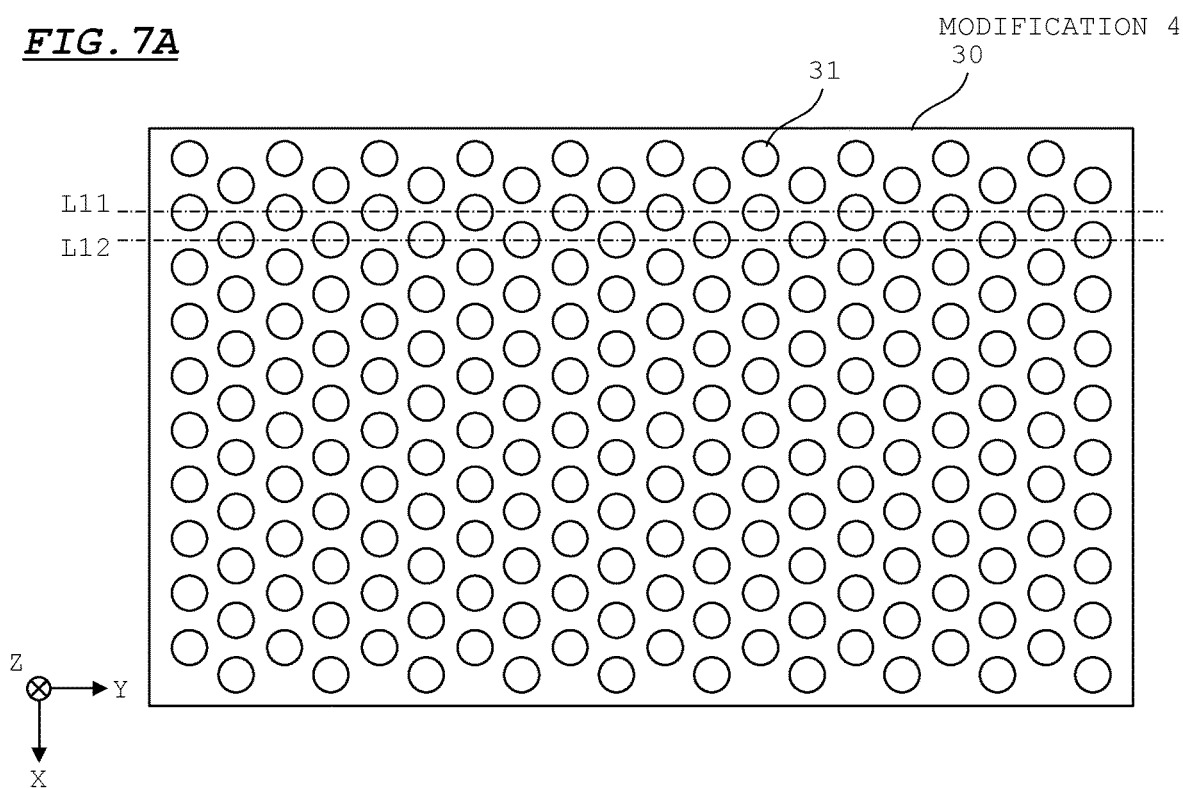
FIG. 7A is a plan view schematically showing a configuration of an electrically-conductive elastic body according to Modification 4.

As in Modification 4 shown in FIG. 7A, between the projections 31 arranged in a row L11 at an odd number and the projection 31 arranged in a row L12 at an even number, the positions of the projections 31 may be shifted by half a pitch in the Y-axis direction. Alternatively, the projections 31 may be radially disposed from the center of the electrically-conductive elastic body 30.

In the above embodiment, the projection 31 has a hemispherical surface shape, but the shape of the projection 31 is not limited thereto. For example, the shape of the projection 31 may be a shape obtained by cutting off a top portion of a hemispherical surface by a plane parallel to the X-Y plane. Alternatively, the shape of the projection 31 may be a cone or a pyramid, or may be a shape obtained by cutting off a top portion of a cone or a pyramid by a plane parallel to the X-Y plane. The projection 31 preferably has a shape of which the cross-sectional area becomes small toward the leading end thereof.

Figure 7B:
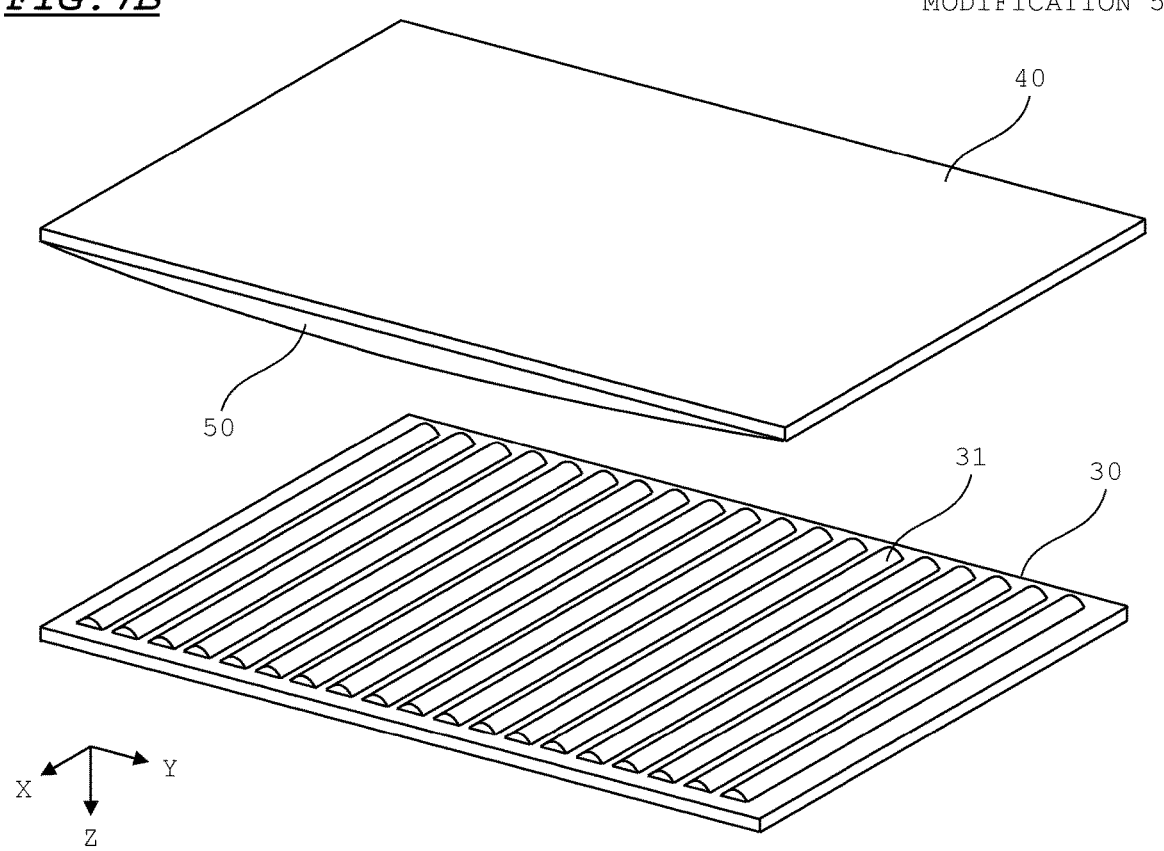
FIG. 7B is a perspective view schematically showing configurations of an electrode, a dielectric body, and an electrically-conductive elastic body according to Modification 5.

Alternatively, each projection 31 may be a ridge that is long in the X-axis direction. For example, as in Modification 5 shown in FIG. 7B, each projection 31 may be a ridge having a semi-columnar shape. In this case as well, effects similar to those in the above embodiment can be exhibited.

The shapes and the heights may be different between the projections 31, and the pitch of the projections 31 need not necessarily be constant. For example, the height and the pitch of the projections 31 may be adjusted such that change in the capacitance with respect to the load becomes closer to being linear. Similarly, change in the thickness of the dielectric body 50 may be adjusted such that change in the capacitance with respect to the load becomes closer to being linear.

In the above embodiment, one electrically-conductive elastic body 30 is disposed for one electrode 40. However, not limited thereto, for one electrode 40, two or more electrically-conductive elastic bodies 30 may be disposed so as to be arranged in the X-Y plane with a predetermined interval from each other. In this case, for example, an external device detects change in the capacitance based on each of the plurality of the electrically-conductive elastic bodies 30, and adds the obtained plurality of capacitances to detect change in the total capacitance. Then, on the basis of the change in the total capacitance, the external device detects the load applied to the load sensor 1.

In addition to the above, various modifications can be made as appropriate to the embodiment of the present invention, without departing from the scope of the technological idea defined by the claims.

What is claimed is:

1. A load sensor comprising:
   an electrode;
   a dielectric body disposed on a surface of the electrode; and
   an electrically-conductive elastic body having electrical conductivity and disposed so as to be opposed to the dielectric body, wherein
   a plurality of projections are formed on a surface on the dielectric body side of the electrically-conductive elastic body, and
   a thickness of the dielectric body decreases in a plane direction from an initial contact position with respect to the electrically-conductive elastic body.

2. The load sensor according to claim 1, wherein the dielectric body has a shape protruding toward the electrically-conductive elastic body.

3. The load sensor according to claim 1, wherein the dielectric body has a shape recessed in a direction away from the electrically-conductive elastic body.

4. The load sensor according to claim 1, wherein a surface on the electrically-conductive elastic body side of the dielectric body has a curved-surface shape.

5. The load sensor according to claim 1, wherein the dielectric body has a shape of which a thickness changes only in a one-axis direction.

6. The load sensor according to claim 5, wherein the dielectric body has a cylindrical shape.

7. The load sensor according to claim 1, wherein on a surface on the electrically-conductive elastic body side of the dielectric body, a plane perpendicular to a load application direction is formed at a position opposed to the projection.

8. The load sensor according to claim 1, wherein the dielectric body is divided into a plurality, and in each divided region, the thickness of the dielectric body changes in a plane direction.

9. The load sensor according to claim 1, wherein the projection projects in a curved-surface manner.

10. The load sensor according to claim 1, wherein a maximum change amount of the thickness of the dielectric body is smaller than a projection amount of the projection.

11. The load sensor according to claim 1, wherein the plurality of projections are disposed so as to be arranged in at least one row, and the thickness of the dielectric body changes in an arrangement direction of the projections.

12. The load sensor according to claim 11, wherein the plurality of projections are arranged at a constant interval.

* * * * *